US011830059B2

(12) United States Patent
Shah

(10) Patent No.: US 11,830,059 B2
(45) Date of Patent: Nov. 28, 2023

(54) LISTING SERVICES WITHIN A NETWORKED ENVIRONMENT

(71) Applicant: eBay Inc., San Jose, CA (US)

(72) Inventor: Ishan Shah, King of Prussia, PA (US)

(73) Assignee: EBAY INC., San Jose, CA (US)

( * ) Notice: Subject to any disclaimer, the term of this patent is extended or adjusted under 35 U.S.C. 154(b) by 40 days.

(21) Appl. No.: 17/315,400

(22) Filed: May 10, 2021

(65) Prior Publication Data

US 2021/0264501 A1 Aug. 26, 2021

Related U.S. Application Data

(63) Continuation of application No. 14/668,759, filed on Mar. 25, 2015, now Pat. No. 11,030,672.

(51) Int. Cl.
*G06Q 30/00* (2023.01)
*G06Q 30/0601* (2023.01)
(Continued)

(52) U.S. Cl.
CPC ........ *G06Q 30/0633* (2013.01); *G01S 5/0284* (2013.01); *G06Q 10/1095* (2013.01);
(Continued)

(58) Field of Classification Search
CPC .. G06Q 30/0633; G06Q 10/1095; G01S 5/02; G01S 5/0284; H04L 63/08; H04L 63/10
See application file for complete search history.

(56) References Cited

U.S. PATENT DOCUMENTS 8,200,247 B1 * 6/2012 Starenky ............... H04W 4/023
455/414.1
8,280,781 B1 10/2012 Pottier et al.
(Continued)

FOREIGN PATENT DOCUMENTS

WO WO-2009101629 A2 * 8/2009 ............. G06Q 10/10

OTHER PUBLICATIONS

Tene et al., To Track or "Do Not Track": Advancing Transparency and Individual Control in Online Behavioral Advertising, Feb. 28, 2012, Minn. JL Sci. & Tech. (Year: 2012).*
(Continued)

*Primary Examiner* — Patricia H Munson
*Assistant Examiner* — Uche Byrd
(74) *Attorney, Agent, or Firm* — SCHWEGMAN LUNDBERG & WOESSNER, P.A.

(57) ABSTRACT

In various example embodiments, a system and method for digital lists of items are presented. An authentication interface module authenticates a first user device to authorize access to listing services of a web resource of a registered vendor. The web resource can generate an add-item request in response to user input from authorized user devices. The add-item request is linked to a first item of a vendor-item list. A list management module updates a selected-item list to include the first item of the vendor-item list and a notification attribute. A notification management module detects a notification event of the first item based on the notification attribute. In response to a detection of a notification event of the first item, the notification management module provides a notification message to one or more user devices linked to the first user account.

19 Claims, 13 Drawing Sheets

(51) Int. Cl.
  *H04L 9/40*      (2022.01)
  *G06Q 10/1093*   (2023.01)
  *G01S 5/02*      (2010.01)

(52) U.S. Cl.
  CPC .............. *H04L 63/08* (2013.01); *H04L 63/10* (2013.01); *G01S 2205/09* (2020.05)

(56) References Cited

U.S. PATENT DOCUMENTS

| | | | |
|---|---|---|---|
| 11,030,672 B2 | 6/2021 | Shah | |
| 2005/0197927 A1 | 9/2005 | Martineau et al. | |
| 2008/0113658 A1 | 5/2008 | Bloebaum et al. | |
| 2010/0332326 A1* | 12/2010 | Ishai | H04W 4/185 715/780 |
| 2011/0238474 A1* | 9/2011 | Carr | G06Q 30/0269 705/14.69 |
| 2012/0066208 A1 | 3/2012 | Yankovich et al. | |
| 2012/0143720 A1 | 6/2012 | Moser | |
| 2012/0166267 A1 | 6/2012 | Beatty et al. | |
| 2013/0275308 A1 | 10/2013 | Paraskeva et al. | |
| 2013/0311327 A1 | 11/2013 | Tehrani et al. | |
| 2014/0214628 A1 | 7/2014 | Argue et al. | |
| 2014/0350840 A1* | 11/2014 | D'Argenio | G01S 5/0284 701/409 |
| 2015/0229623 A1* | 8/2015 | Grigg | H04W 12/64 726/7 |
| 2016/0284009 A1 | 9/2016 | Shah | |

OTHER PUBLICATIONS

U.S. Appl. No. 14/668,759 U.S. Pat No. 11,030,672, filed Mar. 25, 2015, Listing Services Within a Networked Environment.
Advisory action received for U.S. Appl. No. 14/668,759 , dated May 30, 2019, 3 Pages.
Advisory Action Received for U.S. Appl. No. 14/668,759, dated May 20, 2020, 3 Pages.
Final Office Action received for U.S. Appl. No. 14/668,759, dated Mar. 15, 2019, 45 pages.
Final Office Action received for U.S. Appl. No. 14/668,759, dated Feb. 21, 2020, 43 Pages.
First Action Interview—Pre-Interview Communication received for U.S. Appl. No. 14/668,759, dated Mar. 9, 2018, 45 Pages.
First Action Interview Office Action Summary received for U.S. Appl. No. 14/668,759, dated Aug. 10, 2018, 44 pages.
Non Final Office Action Received for U.S. Appl. No. 14/668,759, dated Aug. 5, 2020, 43 Pages.
Non-Final Office Action Received for U.S. Appl. No. 14/668,759, dated Aug. 21, 2019, 47 pages.
Notice of Allowance Received for U.S. Appl. No. 14/668,759, dated Feb. 9, 2021, 14 Pages.
Tene et al., "To Track or "Do Not Track": Advancing Transparency and Individual Control in Online Behavioral Advertising", Feb. 28, 2012, Minn. JL Sci. & Tech. Feb. 28, 2012, 77 Pages.

* cited by examiner

LISTING SERVICES WITHIN A NETWORKED ENVIRONMENT

CLAIM OF PRIORITY

This application is a Continuation of U.S. application Ser. No. 14/668,759, filed Mar. 25, 2015, which is hereby incorporated by reference in its entirety.

TECHNICAL FIELD

Embodiments of the present disclosure relate generally to data processing and, more particularly, but not by way of limitation, to listing services within a network environment.

BACKGROUND

Conventionally, an online marketplace can provide listing services, such as so-called wish lists or gift registries. For example, a user can browse a website of the online marketplace and select one or more items or products to be included in a digital list that is linked to the user account of the user. The online marketplace stores the digital list for later retrieval by the user. The digital list may include information about the selected items, such as a price offered for each item. The user can access the online marketplace to view the digital list to be reminded of items that the user has added to the digital list.

BRIEF DESCRIPTION OF THE DRAWINGS

Various ones of the appended drawings merely illustrate example embodiments of the present disclosure and cannot be considered as limiting its scope.

Figure 1:
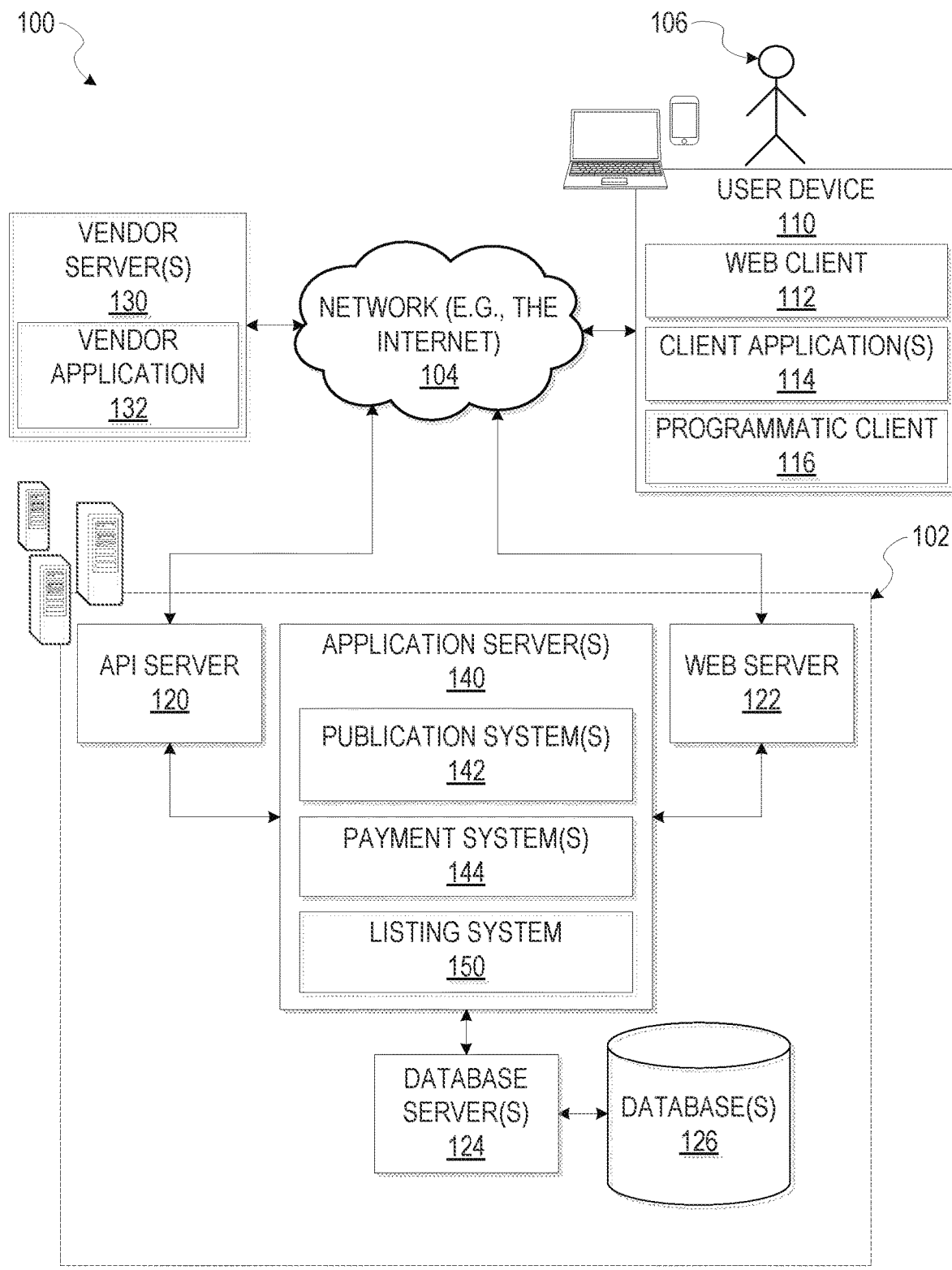
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a listing system provides to users listing services, such as creating, storing, and providing digital lists (also referred to a "selected-item list" herein). The listing system interfaces with multiple vendors and users, as well as multiple user devices of each user. For example, vendors can register vendor accounts that include information regarding one or more items of the respective vendors. Additionally, users can register user accounts for accessing and facilitating listing services provided by the listing system. Registered users can select items of the vendors to generate selected-item lists (e.g., digital wish lists). Accordingly, selected items from different vendors can be organized within a single list.

The listing system provides data access to registered vendors and registered users over a network, such as the Internet. Furthermore, the listing system presents to users a bi-directional, single-sign-on interface deployed by a software application or a website. The bi-directional, single-sign-on interface serves to connect the plurality of browsing devices of a user to a plurality of registered vendors in an efficient manner. Moreover, the digital list can be stored using a network cloud data service to provide access to devices connected to the network.

Registered users add items to their selected-item lists in a number of ways. In one way, a registered user can add an item to a selected-item list by scanning an item or a tag of the item in-store using, for example, a mobile device interfaced with the listing system. In an example embodiment, users can add items of a registered vendor to a selected-item list by scanning a bar-code or any suitable identifier using a camera or sensor of a mobile device in-store. The mobile device can use the bi-directional, single-sign-on interface to send add-item requests to the listing system. The selected-item list is updated by adding the selected item.

In another way, registered users can add items to a list by selecting the items online in an online marketplace of a registered vendor. For example, registered users can browse items of the online marketplace using a mobile application, a website of a registered vendor, or a software application of the listing system.

In example embodiments, the bi-directional, single sign-on interface allows the user to log into any of these applications and websites using the same login information. List data can be stored in a centralized and secured repository so that users can access their lists using a plurality of user devices. Furthermore, the listing system can provide push and/or pull notifications based on GPS location, proximity from store, event, time, etc. Additionally or alternatively, users can share list data and/or notifications with other people.

In one aspect, among others, some example embodiments described herein can improve data organization and can improve converting added items to sales. For example, an online shopper can forget to visit a physical store to view an item that the online shopper was interested in but was hesitant to buy online without first seeing the item. Moreover, users can generate multiple lists that are stored on separate devices and/or hosted by different vendors. The multiple lists can make it difficult for the lists to be used as a way to remind the user about the item. The listing system disclosed herein provides a single list for multiple vendors and sends notification messages to remind the user and/or provide offers to the user. For example, the listing system can provide a notification message to the user when the user is within a proximity of a store that has an item on the user's selected-item list. Furthermore, the listing system sends notifications to the user when a sale or other event impacts purchase price, availability (e.g., a selected item becomes available or its local inventory becomes less than a predetermined threshold), calendar event, and/or the like characteristics that affect a user's ability to acquire the item and/or affects the timing of a user's decision to purchase (reminder of an upcoming anniversary, birthday, business trip, and so forth).

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more user device 110 (also referred to as a "client device"). FIG. 1 illustrates, for example, a web client 112 (e.g., a browser, such as the Internet Explorer® browser developed by Microsoft® Corporation of Redmond, Wash. State), client application(s) 114, and a programmatic client 116 executing on user device 110.

The user device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the user device 110 may comprise a display module (not shown) to display information (e.g., in the form of user interfaces). In further embodiments, the user device 110 may comprise one or more of a touch screen, accelerometer, gyroscope, camera, microphone, global positioning system (GPS) device, and so forth. The user device 110 may be a device that is used by a user to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more user 106 may be a person, a machine, or other means of interacting with user device 110. In embodiments, the user 106 is not part of the network architecture 100, but may interact with the network architecture 100 via user device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each user device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given user device 110, then this application is configured to locally provide the user interface and at least some of the functionalities with the application configured to communicate with the networked system 102, on an as-needed basis, for data and/or processing capabilities not locally available (e.g., access to a database of items available for sale, to authenticate a user, to verify a method of payment, etc.). Conversely, if the e-commerce site application is not included in the user device 110, the user device 110 may use its web browser to access the e-commerce site (or a variant thereof) hosted on the networked system 102.

One or more users 106 may be a person, a machine, or other means of interacting with the user device 110. In example embodiments, the user 106 is not part of the network architecture 100, but may interact with the network architecture 100 via the user device 110 or other means. For instance, the user 106 provides input (e.g., touch screen input or alphanumeric input) to the user device 110 and the input is communicated to the networked system 102 via the network 104. In this instance, the networked system 102, in response to receiving the input from the user 106, communicates information to the user device 110 via the network 104 to be presented to the user 106. In this way, the user 106 interacts with the networked system 102 using the user device 110.

An application program interface (API) server 120 and a web server 122 are coupled to, and provide programmatic and web interfaces respectively to, one or more application server 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database server 124 that facilitate access to one or more information storage repositories or database(s) 126. In an example embodiment, the database(s) 126 is a storage device that stores information to be posted (e.g., publications or listings) to the publication system(s) 142. The database(s) 126 may also store digital item information in accordance with example embodiments.

Additionally, a vendor application 132, executing on vendor server(s) 130, is shown as having programmatic access to the networked system 102 via the programmatic interface provided by the API server 120. For example, the vendor application 132, utilizing information retrieved from the networked system 102, supports one or more features or functions on a website hosted by the vendor. The vendor website, for example, provides one or more promotional, marketplace, or payment functions that are supported by the relevant applications of the networked system 102.

The publication system(s) 142 may provide a number of publication functions and services to a user 106 that accesses the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system 142.

The listing system 150 provides functionality operable to perform various listing services using the user provided data. For example, the listing system 150 may access the user selected data from the databases 126, the vendor server(s) 130, the publication system(s) 142, and other sources. One or more vendor server 130 register vendor accounts with the listing system 150. As will be described in greater detail later below, vendor accounts include data representing a number of vendor items or an inventory of an online marketplace or a physical inventory. Accordingly, a registered vendor is a vendor with a vendor account.

Similarly, a registered user is a user with a user account. One or more user 106 register respective user accounts with the listing system 150. Moreover, each user 106 accesses the user's user account with one or more devices, such as the user device 106, to access selected-item list data. In this way, the listing system 150 provides centralized account data that is accessible by the user devices of the user 106.

Additionally or alternatively, the listing system 150 links the user's 106 activities on one device with the multiple devices of the user 106. As an illustrative example, the user 106 adds items using a desktop computer at home and then receives notifications for the added item based on the user's location as determined by the user's 106 mobile device. In example embodiments, the listing system 150 stores device identifiers for tracking and/or addressing the devices of the user 106. For example, device identifiers can be used to facilitate the sending of notifications to each user device 106.

In operation, the user 106 browses one or more online marketplaces provided by the vendor server(s) 130 and/or the application server(s) 140. The user device 110 provides to the listing system 150 an add item request to add a selected vendor item of a registered vendor to the selected-item list of the user 106. In turn, the listing system 150 accesses the corresponding vendor account and add the vendor item to the selected-item list linked to the user 106. Furthermore, the listing system 150 receives user input that specifies one or more notification attributes. Notification attributes correspond to location-based and/or event-based attributes that specify a notification event that triggers a notification to be sent to the user 106. Accordingly, the listing system 150 monitors for notification events specified by the notification attributes. In response to detecting a notification event, the listing system 150 provides to the user devices 110 linked to the registered user 106 a notification message(s). Notification attributes and notification events will be described in greater detail in connection with FIGS. 2, 7-11.

In example embodiments, the notification message includes a textual, graphical, and/or audible message that provides a reminder to the user 106 of the item of the selected-item list. Additionally or alternatively, the notification message includes an offer or discount for the item of the selected-item list. Additionally or alternatively, the notification message includes a graphical interface element that can be selected to share the notification with another user and/or a graphical interface element that can be selected to have the items delivered to the user.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and listing system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
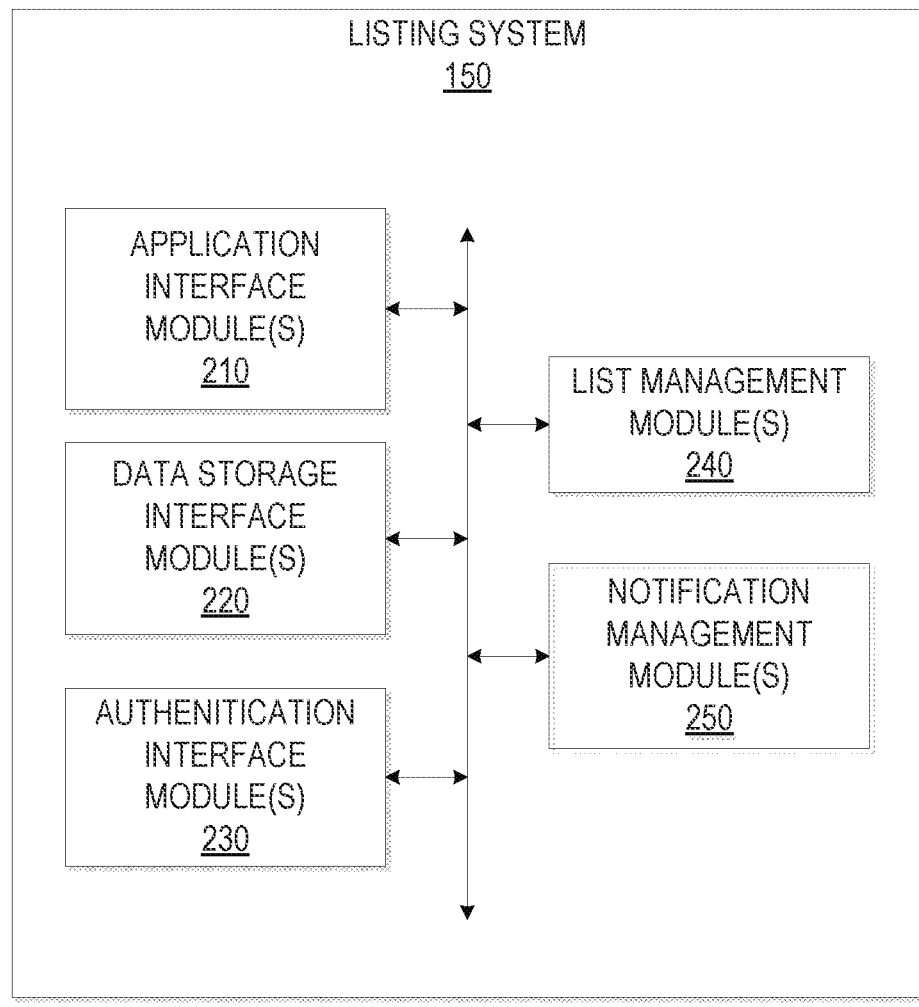
FIG. 2 is a block diagram illustrating an example embodiment of the listing system of FIG. 1 including multiple modules forming at least a portion of the client-server system of FIG. 1.

FIG. 2 is a block diagram illustrating an example embodiment of the listing system 150 of FIG. 1 including multiple modules forming at least a portion of the network architecture 100 of FIG. 1. The modules 210-250 of the illustrated listing system 150 include an application interface module(s) 210, a data storage interface module(s) 220, an authentication interface module(s) 230, a list management module(s) 240, and a notification management module(s) 250. In some embodiments, the components of the listing system 150 are included in the application server(s) 140 of FIG. 1. However, it will be appreciated that in alternative embodiments, one or more components of the listing system 150 described below are included, additionally or alternatively, in other devices, such as one or more of the user device 110 and/or the vendor server(s) 130 of FIG. 1. It will also be appreciated that the listing system 150 are deployed in systems other than online marketplaces.

The modules 210-250 of the listing system 150 are hosted on dedicated or shared server machines (not shown) that are communicatively coupled to enable communications between server machines. One or more of the modules 210-250 are deployed in one or more datacenters. Each of the modules 210-250 is communicatively coupled (e.g., via appropriate interfaces) to the other modules 210-250 and to various data sources, so as to allow information to be passed between the modules 210-250 of the listing system 150 or so as to allow the modules 210-250 to share and access common data. The various modules 210-250 of the listing system 150 furthermore access one or more database 126 via the database server(s) 124.

The application interface module(s) 210 is a hardware-implemented module that facilitates communication of data between the listing system 150 and the user device 110, the vendor server(s) 130, and other devices connected to the network 104. In particular, the application interface module(s) 210 provides a user-facing side for interfacing with one or more user devices 110 and a vendor-facing side for interfacing with one or more vendor server(s) 130, thus providing a bi-directional interface. For example, with reference to FIG. 1, the application interface module(s) 210 interfaces with the API server 120 to provide a pragmatic interface to the client application 114 and/or the programmatic client 116, and/or to provide a web interface to the web client 112. As such, the application interface module(s) 210 facilitates the providing of functions, webpages, data, code, and/or the like web resources between the listing system 150 and the web client 112, the client application(s) 114, and/or the pragmatic client 116, as described in greater detail below.

As stated, the application interface module(s) 210 includes a vendor-facing side for interfacing with one or more vendor server 130. For example, the application interface module(s) 210 interfaces with the API server 120 to provide a pragmatic interface to the vendor application 132 and/or to provide a web interface to the vendor application client 112. As such, the application interface module(s) 210 facilitates the providing of functions, webpages, data, code, and/or the like web resources between the listing system 150 and the vendor application, as described in greater detail below.

The data storage interface module(s) 220 is a hardware-implemented module that facilitates accessing data for the listing system 150. In an example embodiment, the data storage interface module(s) 220 interfaces with the database(s) 126 of FIG. 1 to access one or more user accounts, vendor accounts, selected-item lists, and/or vendor-item lists. In an illustrative example embodiment, a number of data structures accessible by the data storage interface module(s) 220 will be described in greater detail in connection with FIG. 7.

The authentication interface module(s) 230 is a hardware-implemented module that facilitates authenticating and authorizing devices that are communicatively coupled with the listing system 150. In operation, the authentication interface module(s) 230 receives authentication requests from a number of devices, such as, but not limited to, the user device 110 and/or the vendor server(s) 130 of FIG. 1. In example embodiments, an authentication request is a data communication that is indicative of a request for authentication and includes authentication data. For example, authentication data includes identifier (e.g., a user or vendor identifier) and credential (e.g., password) data.

In example embodiments, the authentication interface module(s) 230 facilitates single-sign-on functionality. For example, the authentication interface module(s) 230 receives authentication data from the user 106, as part of a first sign-on process, to support authentication of the user 106 to receive serves of one or more vendor server 130. The authentication data supplied by the user 106 is then used by the authentication interface module(s) 230 to support the authentication of the user 106 to one or more vendor servers 130.

The authentication interface module(s) 230 uses the authentication data in a number of ways to authenticate the user 106 with one or more vendors 130. For example, the authentication interface module(s) 230 passes authentication data directly to one or more vendor server 130 as part of a second sign-on process. The authentication interface module(s) 230 uses the authentication information to retrieve other user identification and user credential information stored within the listing system 150. The other user identification and user credential information are used as authentication for one or more vendor server 130. The authentication interface module(s) 230 stores and caches the authentication data and use the authentication data at a time a request for vendor services is made by the user 106.

An example embodiment, the authentication interface module(s) 230 performs the authentication process. It will be appreciated, however, that in alternative example embodiments, the authentication interface module(s) 230 interfaces with a third-party authentication service (not shown) connected to the network 102 that performs the authentication process and returns the results to the authentication interface module(s) 230. Examples of third party services include authentication services provided by EBAY™, GOOGLE™, FACEBOOK™, LINKEDIN™, MICROSOFT™, SAP™, and so forth. In this way, the user 106 provides a user name and password that are shared by another service as a way to log into the listing system 150.

The authentication interface module(s) 230 grants access to listing services provided by the listing system 150. In example embodiments, the access can be restricted access to protect privacy. For example, the authentication interface module(s) 230 grants the user device 110 access to a user account linked to the authentication data provided by the user device 110, and denies access to user accounts not linked to the authentication data provided by the user device 110. Similarly, the authentication interface module(s) 230 grants the vendor server(s) 130 access to a vendor account linked (e.g., via a vendor identifier) to the authentication data provided by the vendor server(s) 130, and denies access to vendor accounts not linked to the authentication data provided by the user device 110.

Additionally or alternatively, the authentication interface module(s) 230 grants an authenticated vendor server 130 access to portions of the selected-item lists of registered users. The portions correspond to the selected items of the authenticated vendor server 130 but not selected items of other registered vendors. In this way, the registered vendor determines a number of instances that a given vendor item has been added to selected-item lists and/or push notifications to the registered users that have added the registered vendor's items. The authentication interface module(s) 230 will be described in greater detail later in connection with FIGS. 3 and 8.

The list management module(s) 240 is a hardware-implemented module that facilitates maintaining the selected-item lists of the registered users of the listing system 150. In operation, the list management module(s) 240 can receive a number of requests from registered users and registered vendors. For example, the list management module(s) 240 receives add-item, remove-item, edit-item, share-item, and the like requests from registered users. The list management module(s) 240 receives notify-users and query requests from registered vendors. A notify user request is a request to provide a notification (e.g., an alert, promotion, discount, sale, and/or the like) to users having an identified item of the registered vendor and/or any items from the registered vendor within the registered user's selected-item list. The list management module(s) 240 will be described in greater detail later in connection with FIGS. 5-6 and 8.

The notification management module(s) 250 is a hardware-implemented module that facilitates providing registered users notifications related to their respective selected-item lists. In operation, notification management module(s) 250 monitors for notification events related to items of the selected-item lists. Notification events trigger the notification management module(s) 250 to provide notification messages to one or more registered users. The list management module(s) 240 will be described in greater detail later in connection with FIGS. 8-11.

In operation, the listing system 150 receives data from one or more vendor server 130 and the one or more user devices 110, e.g., via the application interface module(s) 210. The received data from the vendor server(s) 130 correspond to a number of inputs or requests related to, for example, authentication; creating or editing vendor accounts; adding, removing, and editing vendor-item lists; pushing notifications to registered users; and/or requesting analytics, as described below in greater detail.

Additionally or alternatively, the received data from the user devices 110 correspond to a number of inputs or requests related to, for example, authentication; creating or editing user accounts; adding, removing, or editing selected-item lists; sharing data (e.g., sharing selected items and/or notifications); and/or requesting delivery, as described below in greater detail.

Example methods of operation of the modules 210-250 will be described in greater detail later in connection with FIGS. 8-11.

FIGS. 3-6 are interface diagrams illustrating example user interfaces 300, 400, 500, 600 of a web resource with multiple display elements delivered to the user device 110 by the listing system 150, according to an example embodiment. As used herein, a web resource corresponds to data and/or code delivered to the user device 110 over the network 104 to render a webpage, or to be processed and/or rendered by a software application executing on the user device 110.

Figure 3:
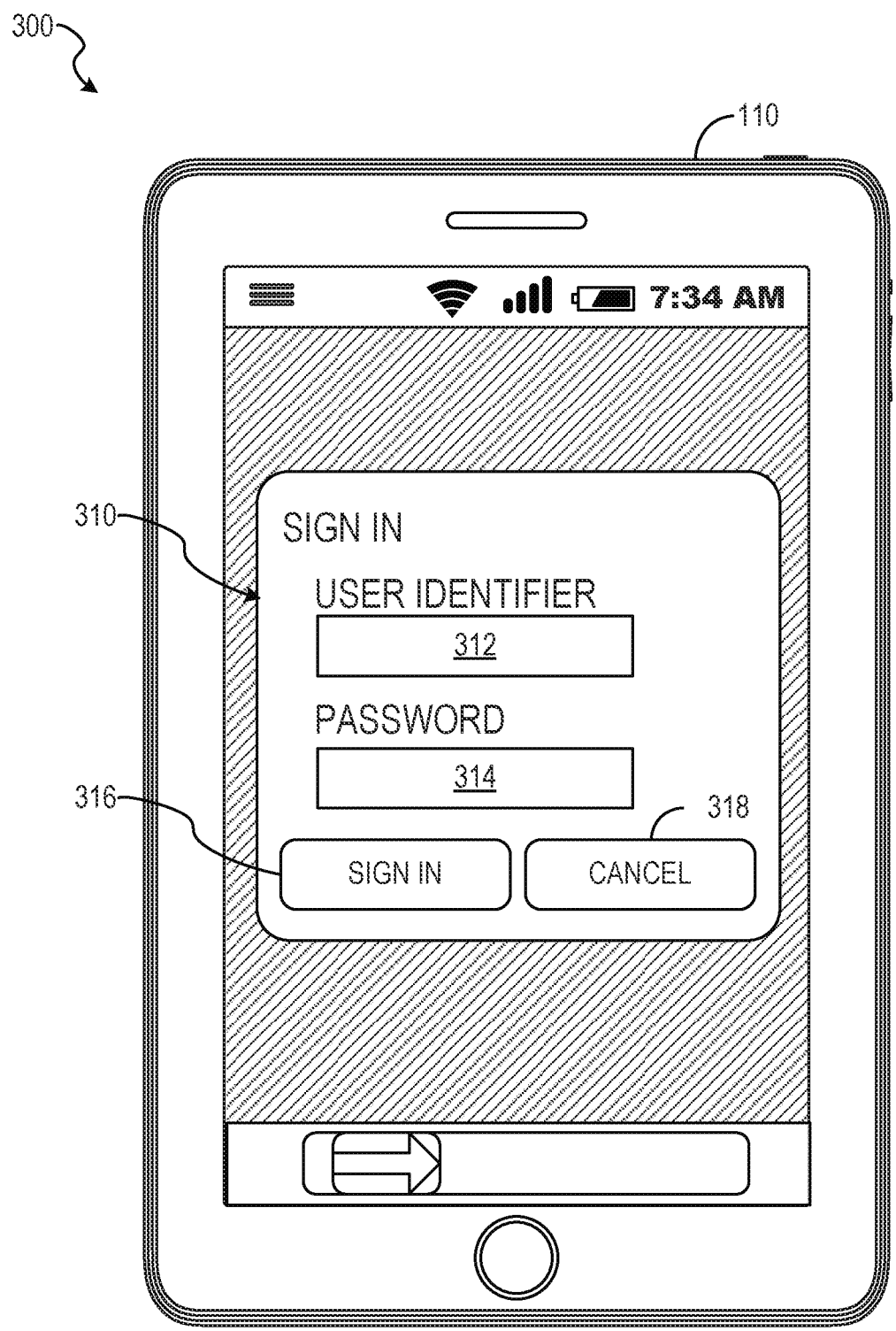
FIGS. 3-6 are interface diagrams illustrating example user interfaces of a web resource with multiple display elements delivered to the user device by the listing system, according to an example embodiment.

FIG. 3 is an interface diagram illustrating a user interface 300 including the user device 110 rendering a sign-in frame 310. For example, the listing system 150 provides the sign-in frame 310 to the user device 110 in response to the user device 110 requesting or accessing a web resource that provides listing services supported by the listing system 150. Examples of the requesting or accessing of the web resource includes launching a software application to be executed on the user device 110 and/or requesting a webpage that interfaces with the listing system 150. User input received by the sign-in frame 310 from the registered user is transmitted to the listing system 150.

In one example embodiment, the accessing or requesting of the web resource corresponds to initiating listing services from a website of an authorized vendor such that an authorized registered user adds selected items displayed on the website of the registered vendor to the registered user's selected-item list. Additionally or alternatively, the accessing or requesting of the web resource corresponds to starting a software application executing on the user device 110. The software application provides authenticated registered users access to the listing services of the listing system 150 and accesses vendor-item lists of one or more registered vendors. Accordingly, the software application presents interfaces to the authenticated registered user that provide access the listing services through a single application.

In the illustrated example embodiment of FIG. 3, the sign-in frame 310 includes interface elements 312, 314 for receiving user input to generate an authentication request. The interface element 312 receives data corresponding to a user identifier, such as a username. The interface element 314 receives data, such as a password, that is usable to validate the user of the user device 110 as the registered user. Furthermore, the sign-in frame 310 includes control elements 316, 318. The control element 316 is user-selectable to cause the user device 110 to provide the listing system 150 an authentication request. For example, the authentication request includes the data received by the interface elements 312, 314. The control element 318 is user-selectable to cause the user device 110 to cancel the access to the web resource. An example method of authentication will be described in greater detail later in connection with FIG. 8.

Figure 4:
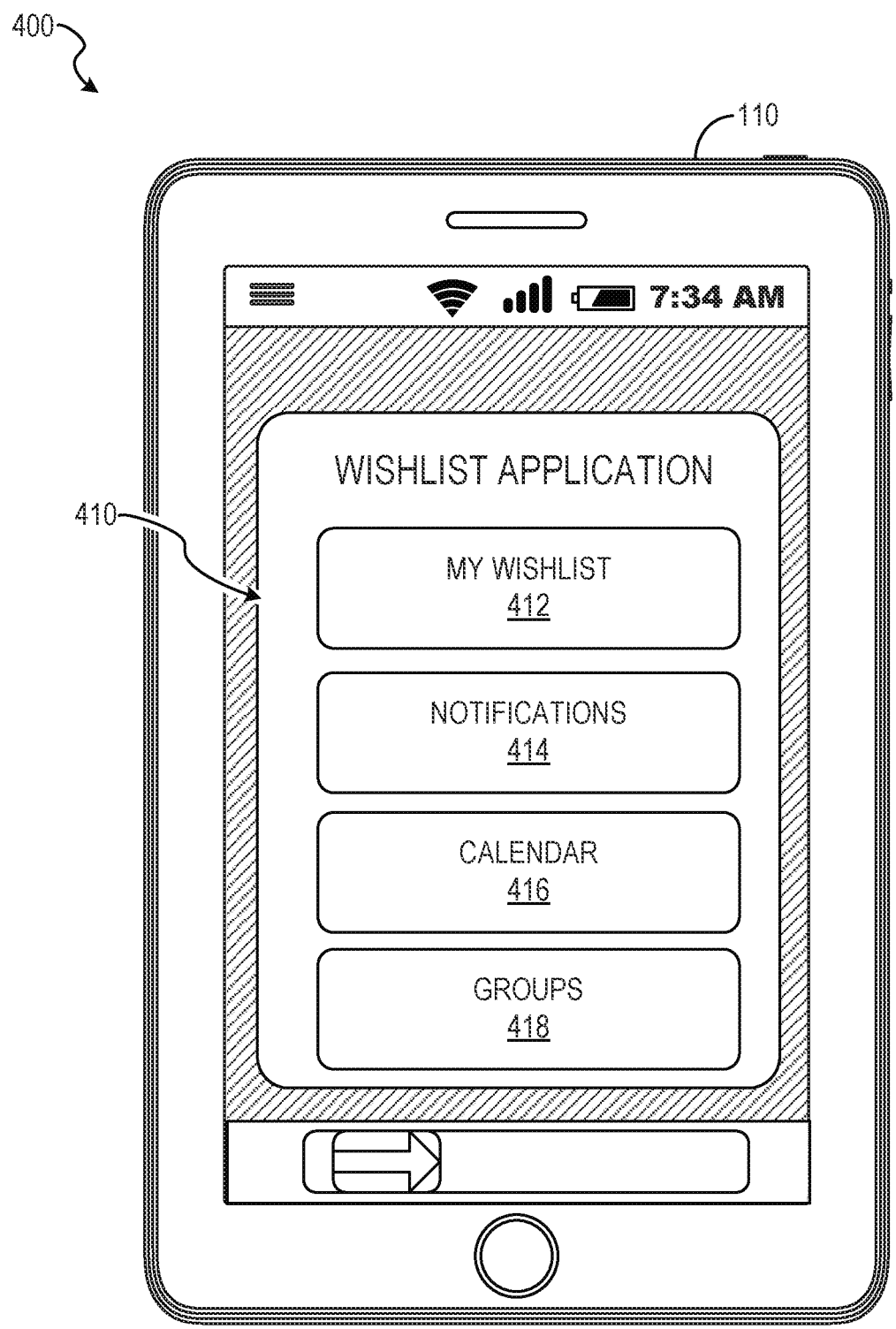

FIG. 4 is an interface diagram illustrating a user interface 400 including the user device 110 rendering a first frame 410 of the web resource providing listing services. In an example embodiment, the first frame 410 corresponds to a display, such as a "home screen," of a software application or web application interfaced with the listing system 150. The first frame 410 is presented to the registered user in response to a successful authentication process, e.g., initiated via the user interface 300 of FIG. 3. User input received by the first frame 410 from the registered user is transmitted to the listing system 150.

The first frame 410 includes a number of control elements 412-418 that are user-selectable to access features and/or display information of the listing system 150. For example, the control element 412 is selected by the registered user to access a user interface displaying listing information regarding the user's selected-item list. The listing information is displayed in a variety of formats, as will be described in greater detail later in connection with FIGS. 5 and 6. The control element 414 is selected by the registered user to access notifications features. The control element 416 is selected by the registered user to access calendar features. The control element 418 is selected by the registered user to access group or social features. User input received by the control elements 412-418 is transmitted by the user device 110 to the listing system 150 over the network 104.

In example embodiments, the control element 414 is selected by the user to access notifications messages received by the user device 110. The control element 416 is selected by the user to access calendar features. For example, selection of the control element 416 causes the first frame 410 to present a calendar view with a number of calendar events depicted. The calendar events correspond to scheduled appointments, meetings, and/or the like events. Calendar event data can be synced from a calendar application of a third-party application.

The control element 418 can be selected by the user to access group or social features. For example, selection of the control element 418 causes the first frame 410 to present a list of groups of registered users, within each of which are selected-item lists that are shared by the members of the group. The group is formed based on a social network and/or a social graph relationship structure. For example, in example embodiments, a registered user can select which members of the group to receive notification messages from or to share notification messages with.

Notification attributes that define notification events are created in a number ways. For example, while adding an item to selected-item list, a registered user is prompted to define a notification event or not. If the registered user selects to create a notification event, a menu is presented to the user to provide a number of choices to the registered user. For example, the registered user chooses between a location-based (e.g., GPS) trigger and an event-based (e.g., calendar data) trigger. Alternatively, a notification event is created by the registered user selecting a display element (e.g., an image of the item) that represents the selected item of the item list in order to create a notification event linked to the item. In example embodiments, examples of notification events include a sale, price change, quantity availability, or other characteristics that can affect either the decision to purchase or the timing of a purchase.

If the registered user selects a location-based trigger, the user device 110 presents to the registered user an interface display having an element for receiving user input to specify a threshold distance. For instance, if the listing system 150 detects that the registered user is within a threshold distance of the store having the selected item in inventory, the listing system 150 provides the registered user a notification message. In some example embodiments, if the registered user does not provide a distance, a default value will be used (e.g., a 2 mile radius). The default value can be user selectable. Furthermore, the registered user can select threshold distances on individual item and/or store basis. In this way, the registered user prioritizes purchases.

If the registered user selects an event-based trigger, then the user device 110 presents a calendar that the registered user uses to associate calendar notifications with items from the selected-item list. In this way, items, occasions, and notifications are presented on a common interface.

Figure 5:
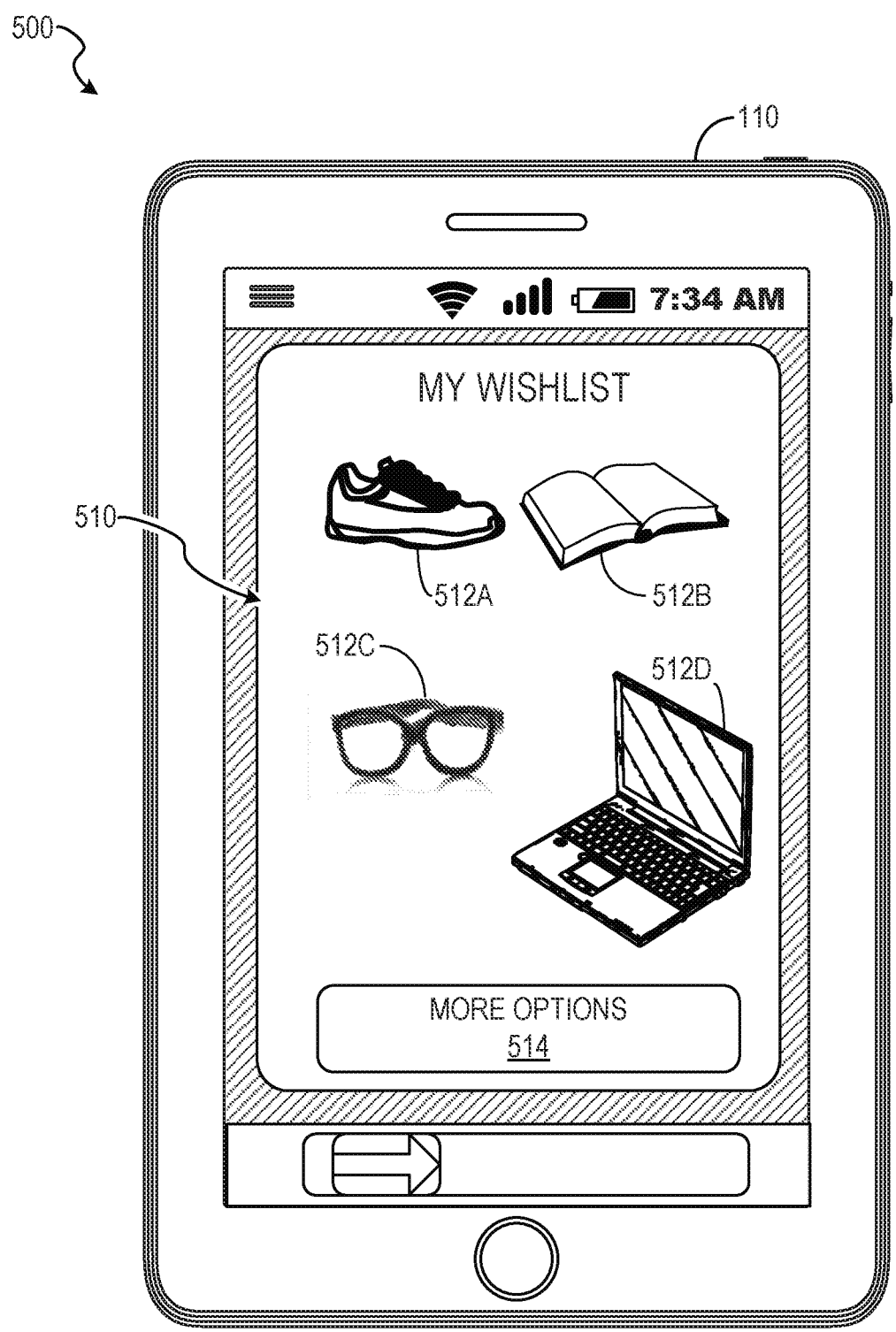

FIG. 5 is an interface diagram illustrating a user interface 500 including the user device 110 rendering a second frame 510 of the web resource providing listing services. In an example embodiment, the second frame 510 corresponds to a display of a software application or web application interfaced with the listing system 150. The listing system 150 provides data to the user device 110 to render the second frame 510 in response to the listing system 150 receiving an indication that the user selected the control element 412 of FIG. 4 to request a display of the registered user's selected-item list. User input received by the second frame 510 from the registered user is transmitted to the listing system 150.

The second frame 510 includes a number of display elements 512A-D and a control element 514. The display elements 512A-D correspond to items of the selected-item list linked to the registered user. The control element 514 is selectable by the registered user to control the organization of the displayed display elements 512A-D, search the selected-item list of the registered user, and/or to filter the selected-item list of the registered user to select which types of items to display within the second frame 510.

Figure 6:
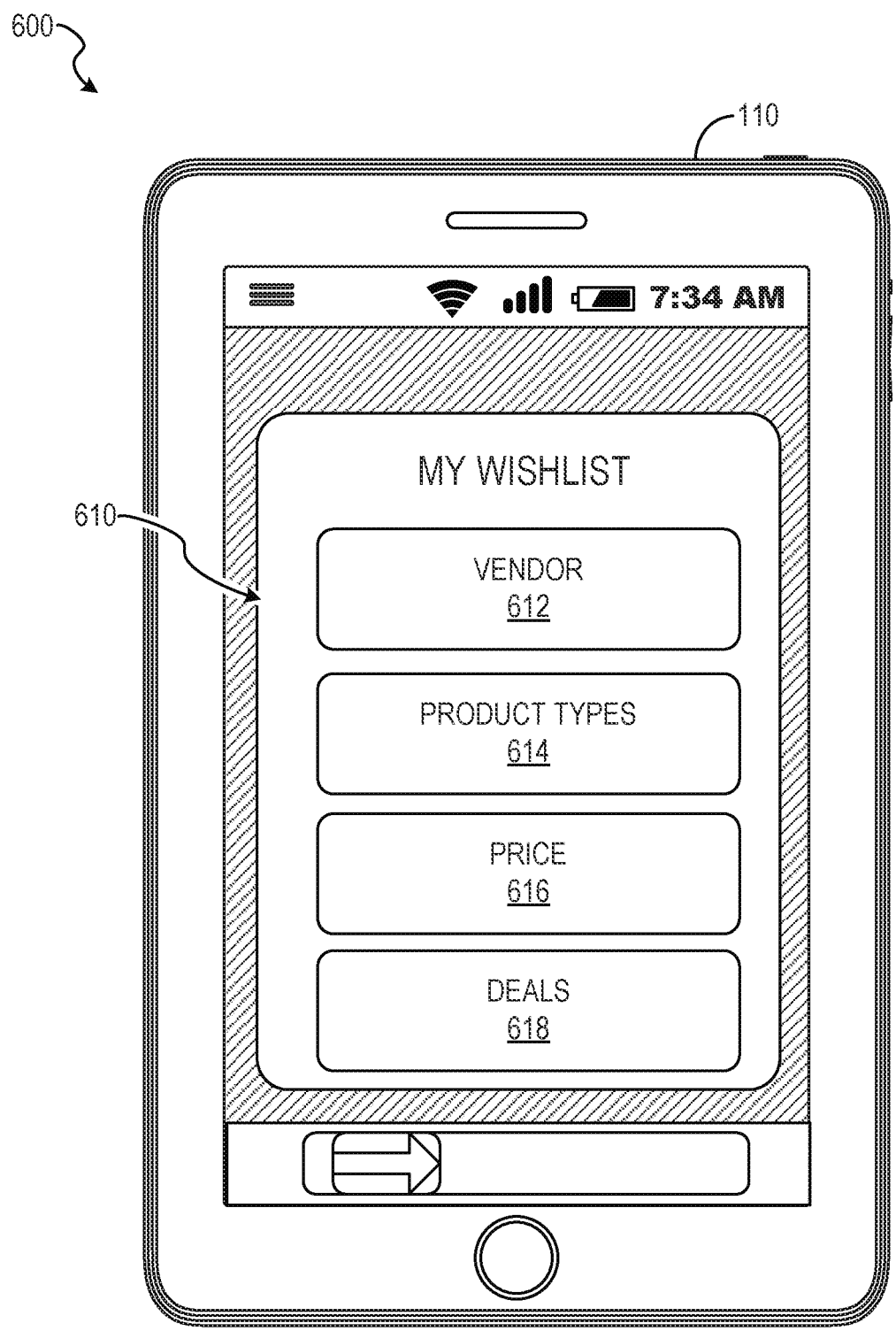

FIG. 6 is an interface diagram illustrating a user interface 600 including the user device 110 rendering a third frame 610 of the web resource providing listing services. In an example embodiment, the third frame 610 corresponds to a display of a software application or web application interfaced with the listing system 150. The listing system 150 provides data to the user device 110 to render the third frame 610 in response to the listing system 150 receiving an indication that the registered user selected the control element 514 of FIG. 5. User input received by the third frame 610 from the registered user is transmitted to the listing system 150.

The third frame 610 includes a number of control elements 612-618 that can be selected by the registered user to control the display of the display elements 512A-D. Accordingly, the user device 110, in response to receiving user input of a selection of one of the control elements 612-618, displays the second frame 510 with the display elements 512A-D organized and/or filtered in accordance with the selection of the selected control element 612-618. For example, the control element 612 is selectable by the registered user to organize the display elements 512A-D by the one or more registered vendors. In this way, the items of the selected-item list that are linked to a first registered vendor are grouped together within the second frame 510, the items of the selected-item list that are linked to a second registered vendor are grouped together within the second frame 510, and so forth.

Additionally or alternatively, the third frame 610 includes the control element 614 that is selectable by the registered user to organize the display elements 512A-D by item types (e.g., types of clothing, accessories, electronics, collectables, antiques, etc.). In this way, the items of the selected-item list that are linked to a first item type are grouped together within the second frame 510, the items of the selected-item list that are linked to a second item type are grouped together within the second frame 510, and so forth.

Additionally or alternatively, the third frame 610 includes the control element 616 that is selectable by the registered user to organize the display elements 512A-D by price, e.g., by ascending and/or descending order, e.g., as a flat list or grouped by price ranges ($0-10, $10-$50, $50-$105, and so forth).

Additionally or alternatively, the third frame 610 includes the control element 618 that is selectable by the registered user to organize the display elements 512A-D by displaying items of the selected-item list that are on sale or have some other promotional offer associated with the items.

Figure 7:
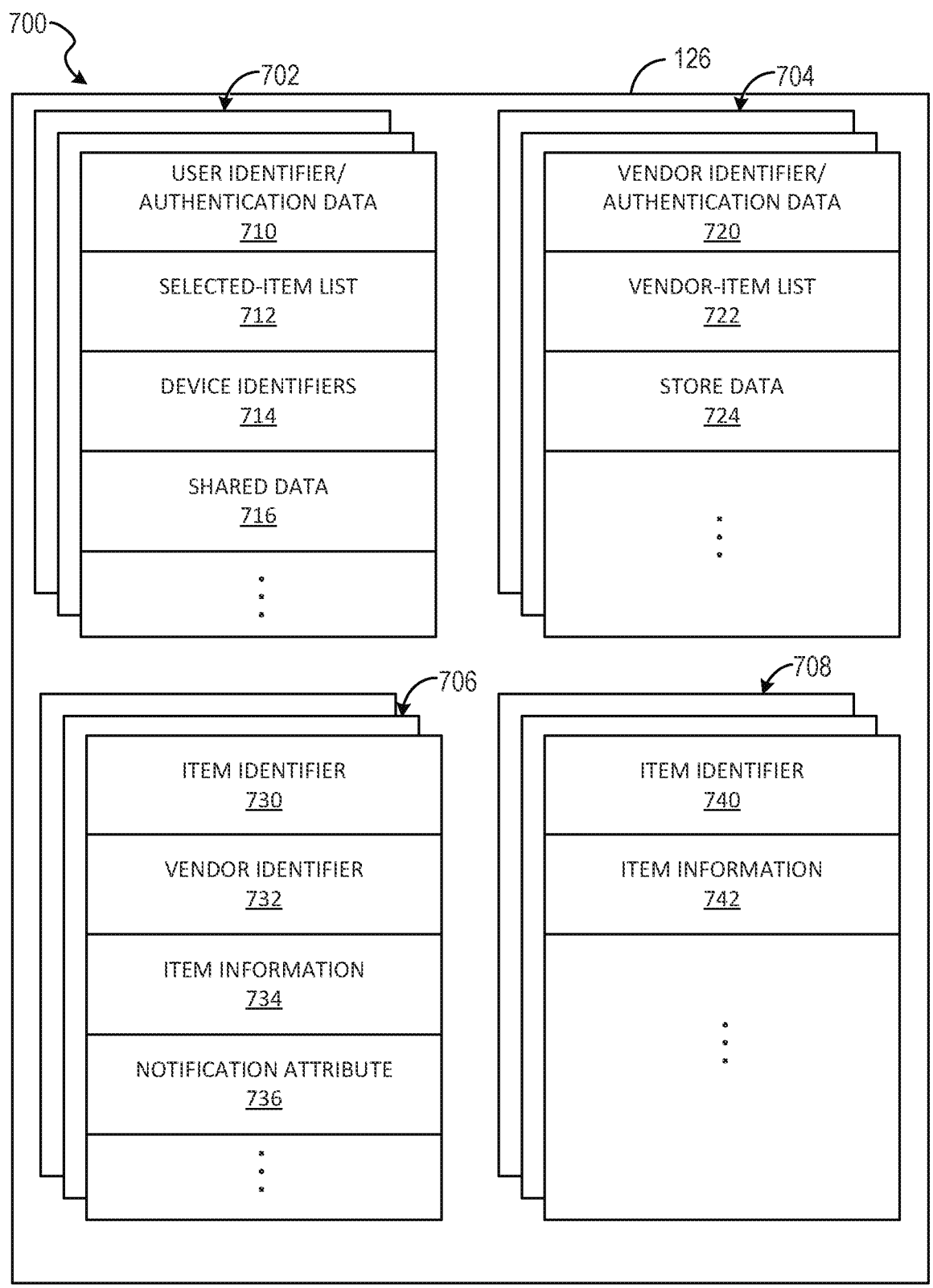
FIG. 7 is a block diagram illustrating an example data memory system including a number of data structures of the listing system, in accordance with an example embodiment.

FIG. 7 is a block diagram illustrating an example data memory system 700 including a number of data structures of the listing system 150, in accordance with an example embodiment. The data memory system 700 includes one or more user account 702, one or more vendor account 704, one or more selected item record 706, and one or more vendor item record 708. It will be appreciated that the data of the data memory system 700 are stored together or separately in a number of data storage devices by one or more components of the client-server-based network architecture 100. In an example embodiment, the data memory system 700 is stored by the database(s) 126 of FIG. 1. The data storage interface module(s) 220 (FIG. 2) of the listing system 150 accesses the data memory system 700.

Respective user accounts 702 includes a user identifier data field 710, a selected-item list data field 712, a device identifiers data field 714, and a shared data field 716. The user identifier data field 710 includes data that link a registered user to a particular one of the user accounts 702. Furthermore, the user identifier data field 710 include credential data (e.g., passwords, token-based identifier, and/or biometric data indicative of one or more of the user's fingerprint, palm veins, face, deoxyribonucleic acid, palm print, hand geometry, iris pattern, or voice pattern) that are used by the listing system 150 to process authentication requests and verify the identity of the user of the user device 110. The selected-item list data field 712 includes (or reference to) one or more of the selected item records 706, which will be described in greater detail below. The device identifiers data field 714 includes one or more device identifiers of one or more user devices (e.g., user device 110) linked to the corresponding registered user. In an example embodiment, the device identifiers include data that is usable by the listing system 150 to address the corresponding user devices 110 over the network 104.

The shared data field 716 includes data that indicates sharing privileges of the registered user and one or more other registered users. For example, the shared data field 716 includes data that indicates that the registered user is sharing one or more selected item records 706 and/or one or more items from the selected item records 706 with another registered user. Additionally or alternatively, the shared data field 716 includes data that is indicative of sharing notifications with another user who may be a registered user or may not be a registered user. In the case that the second user is not a registered user, the shared data field 716 includes data (e.g., email address, phone number for a text message, etc.) that is usable to address the second user.

Respective vendor accounts 704 includes a vendor identifier data field 720, a vendor-item list data field 722, and a store data field 724. The vendor identifier data field 720 includes data that link a registered vendor to a particular one of the vendor accounts 704. Furthermore, the vendor identifier data field 720 includes authentication data that are used by the listing system 150 to process authentication requests by registered vendors and verify the identity of the user of the vendor server(s) 130. The vendor-item list data field 722 includes or reference one or more of the vendor item record 708, which will be described in greater detail below. The store data field 724 includes data that is indicative of one or more attributes of store locations of the registered vendor. For example, the store data field 724 includes data that is indicative of store locations, store inventories, the approximate locations of items of the store inventory within the store, and the like attributes.

Respective selected item records 706 include an item identifier data field 730, a vendor identifier data field 732, an item information data field 734, and a notification attribute data field 736. The item identifier data field 730 includes data that are used to identify a vendor item of a given registered vendor. The vendor identifier data field 732 includes data that are used to identify a particular registered vendor. Accordingly, in example embodiments, the item identifier data field 730 and the vendor identifier data field 732 are used together to uniquely identify a vendor item and a registered vendor.

The item information data field 734 include data that is indicative of one or more characteristics and/or attributes of the item identified by the item identifier data field 730 and the vendor identifier data field 732. Examples of characteristics and/or attributes include an image, quantity, size, item type, price, sales, discounts, offers, and/or the like data to describe the selected item.

The notification attribute data field 736 includes one or more attributes that are indicative of one or more notification events. As stated, notification events are location-based and/or event-based. For example, in example embodiments, attributes that are location-based indicate a threshold distance from store locations of the registered vendor identified by the vendor identifier data field 732 or from any suitable locations specified by the registered user. As such, the listing system 150 provides to the corresponding authorized user a notification when the registered user (or shared contact) is within the threshold distance from the specified location, such as a store location of the registered vendor. Additionally or alternatively, in example embodiments, attributes that are event-based correspond to a date, a calendar event (e.g., a birthday of the user or of a contact, an anniversary, business trip, vacation, and so forth), a reoccurring day/time (e.g., Mondays at 3:00 PM, the first Saturday of each month, every 30 days, and so forth). Additionally or alternatively, event-based attributes include sales or other events that impact purchase price, availability (e.g., a selected item becomes available or its local inventory becomes less than a predetermined threshold), and/or the like characteristics that affect a user's ability to acquire the item and/or affects the timing of a user's decision to purchase. In response to the date or event occurring, the listing system 150 provides to the corresponding authorized user a notification.

Respective vendor item records 708 include an item identifier data field 740 and an item information data field 742. The item identifier data field 740 and the item information data field 742 includes data similar to the data that was described above in connection with the item identifier data field 730 and the item information data field 734, respectively.

Figure 8:
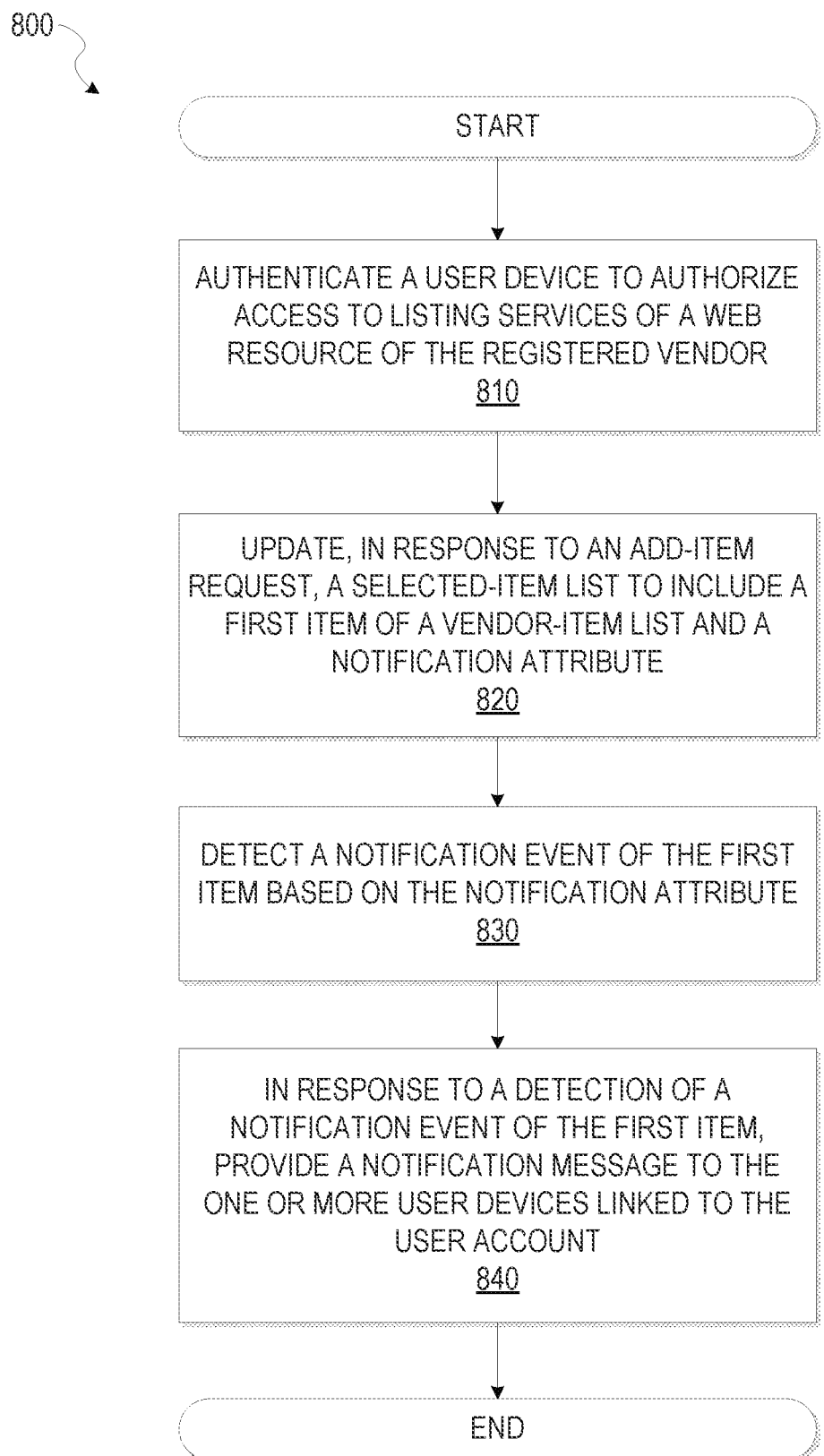
FIG. 8 is a flowchart illustrating an example method of providing notifications, in accordance with an example embodiment.

FIG. 8 is a flowchart illustrating an example method 800 of providing notifications, in accordance with an example embodiment. In this example, the method 800 includes operations such as authenticating a user device (block 810), updating a selected items list (block 820), detecting a notification event (block 830), and providing a notification message (block 840). The example method 800 will be described below, by way of explanation, as being performed by certain modules. It will be appreciated, however, that the operations of the example method 800 can be performed in any suitable order by any number of the modules shown in FIG. 2.

In an example embodiment, the method 800 starts at block 810, in which the authentication interface module(s) 230 authenticates a user of a user device, such as the user 106 of the user device 110 of FIG. 1. In operation, the authentication includes the authentication interface module(s) 230 receiving an authentication request from the user device 110. The authentication request corresponds to a request for authorization to access listing services of a web resource. The authentication request includes authentication data, such as a user identifier and a password or other credential. As stated, the web resource corresponds to a software application executing on the user device that is communicatively coupled to the listing system 150 via the network 104, and/or the web resource corresponds to data and/or code (e.g., webpage data) to render a website on the user device. Example interfaces of the web resource were described above in connection with FIGS. 3-6.

In example embodiments, the user device 110 renders a user interface (e.g., as described in connection with FIG. 3) for receiving authentication data from the user 106 and initiating the authentication process. The listing system 150 receives authentication data from the user device 110 via the API server 120 (e.g., where the user device 110 executes an application-based program supporting listing services) and/ or via the web server 122 (e.g., where the user device 110 displays a webpage supporting listing services of the listing system 150). For example, the authentication request is generated, for example, by the user device 110 and sent to the listing system 150 based on the user device receiving authentication data from the interface elements 312, 314 and, in response to, receiving a user selection of the control element 316 of FIG. 3.

By way of an illustrative non-limiting example, the authentication request will be described below in the example context of being generated by a webpage of an online marketplace of a registered vendor. For instance, to access listing services within the online marketplace, the webpage of the online marketplace includes a sign-in component (e.g., user interface 300) to facilitate authentication of the user 106 of the user device 110, and the vendor server 130 sends authentication requests to the listing system 150. In turn, the listing system 150 processes the authentication requests and provides to the vendor server 130 the results (e.g., pass or fail) of the authentication. If an authentication request passes, the vendor server 130 enables the listing services of the online marketplace for the user 106.

Example embodiments of the processing of the authentication request includes selecting user account data and verifying that the credentials of the authentication request matches an expected value stored in the selected user account data. For example, the authentication interface module(s) 230 selects a user account 702 that has an identifier stored within the user identifier field 710 that matches the user identifier of the authentication request. Furthermore, the listing system 150 compares the credential (e.g., password) of the authentication request with the credential (e.g., password) stored within the user identifier data field 710 of the selected user account 702 to determine whether the authentication request passes authentication. For example, authentication passes if the user identifier and password of the authentication request matches the user identifier and authentication data stored in the user identifier data field 710. Matching is determined based on direct matching or indirectly based on passing the credential of the request and/or the authentication request using a mapping function (e.g., a hash function).

In response to a determination that the user authentication request passes authentication, the authentication interface module(s) 230 authenticates the user device to a server of the registered vendor. For example, the listing system 150 returns to the vendor server 130 data indicative of passing authentication that causes the vendor server 130 to enable on the user device 110 graphical interface elements (e.g., user-selectable control elements) that are associated vendor items. The control elements are each be selectable to generate add-item requests that are sent to the listing system 150 to add the associated vendor item to the selected-item list of the user.

As described above, the user 106 initiates the authentication process via a website of a registered vendor. It will be appreciated that in example embodiments the user 106 generates authentication requests in a number of additional or alternative ways. For example, the online marketplace links the online marketplace to the listing system 150 such that when the user 106 requests to sign in for listing services, the online marketplace transfers the user 106 to the listing system 150 for authentication. That is, in example embodiments, the listing system 150 provides a webpage (e.g., user interface 300) to the user 106 for authenticating the user 106 instead of the online marketplace of the vendor server 130. Thus, the listing system 150 directly prompts the user 106 for authentication requests, receives authentication requests, processes authentication requests, and provides to the vendor server 130 the results (e.g., pass or fail) of the authentication. In another example, an application (e.g., a software application for a mobile device and/or a desktop computer) executed on the user device 110 provides a GUI (e.g., user interface 300) to the user 106 for authenticating the user 106. The application corresponds to a software application dedicated to an online marketplace (e.g., an application for a particular vendor) and/or an application for providing direct access to the listing system 150 (e.g., a so-called "wishlist app"). The listing server 150 receives authentication data from the application, processes the application data, and returns the results to the application.

In example embodiments, the listing system 150 provides authentication-certificate data to the user device 110 as a way to authenticate the user 106 of the user device 110 with one or more different web resources (such as different websites of a number of registered vendors). That is, the authentication-certificate data serves as an authentication "passport" that authorizes access to listing services deployed on a number of different web resources. For example, the authentication of the user 106 of the user device 110 with the server of the registered vendor includes providing to the user device 110 an authentication-certificate usable to provide the user device 110 access to listing features of web resources of a plurality of registered vendors. In this way, the listing system 150 provides a single-sign-in feature that allows registered users to sign in once and then access multiple different web resources without signing in again.

The authentication interface module(s) 230 also serves to authenticate registered vendors. For example, in operation, the authentication interface module(s) 230 receives a vendor authentication request from the vendor server(s) 130. In response, the authentication interface module(s) 230 determines whether the vendor authentication request passes authentication. The determination of whether an authentication passes is based on matching the vendor identifier data field 720 (which includes a vendor identifier and credential data) to the vendor identifier and credential data included in the vendor authentication request. Furthermore, in response to a determination that the vendor authentication request passes authentication, the authentication interface module(s) 230 authenticates the vendor server(s) 130 to allow the vendor server(s) 130 data linked to the vendor account, as de.

In example embodiments, authenticated vendor server(s) 130 accesses data and/or services that are linked to the selected item records 706 that correspond to a vendor item (e.g., a vendor item record 708) of the registered vendor. For example, registered vendors push notifications (e.g., sales, discounts, offers, and/or the like alerts) to registered users that have vendor items linked (e.g., added to a selected-item list) to the respective registered vendors. Additionally or alternatively, the listing system 150 (e.g., via the list management module(s) 240) provides analytics data to a registered vendor, where the analytics regard, e.g., a number of registered users that have vendor items of the registered vendor included in their selected-item list data field 712 and/or the number of selected vendor items of the registered vendor that have been included in the selected item records 706. In example embodiments, the analytics provide no indication of selection of the vendor items from other registered vendors.

The authentication interface module(s) 230 can protect the privacy of the registered users and vendors. For example, in example embodiments, the authentication interface module(s) 230 presents to a registered user a privacy setting that is selected to prevent the selected-item list data field 712 from being shared with other registered users and/or registered vendors without the registered users' permission. Additionally or alternatively, the authentication interface module(s) 230 presents to the registered vendors a privacy setting that is selected to prevent data related to their vendor-item lists from being shared with other registered vendors.

As stated, the web resources generate an add-item request in response to user input received by authorized user devices. For example, a number of vendor items are displayed on the user interface of the user device with an associated interface control element (such as a selectable user interface button) that is activated by a registered user to request adding of the selected vendor item to the selected-item list that is linked to the registered user. Accordingly, the add-item request is linked to the corresponding vendor item. In example embodiments, the add-item request includes a user identifier (e.g., data that can be matched to the identifier of the user identifier data field 710 to identify a user account 702), a vendor identifier (e.g., data that can be matched to the identifier of the vendor identifier data field 720 to identify the vendor account 704), and an item identifier (e.g., data that can be matched to the identifier of the item identifier data field 740 to identify the selected vendor item 708).

At block 820, the list management module(s) 240, in response to the add-item request, updates the selected-item list data field 712 to include the selected item of the vendor-item list. To this end, the list management module(s) 240 uses the user identifier, vendor identifier, and item identifier of the add-item request to identify and select the user account 702, the vendor account 704, and the user-selected vendor item 708 of the add-item request.

Additionally, the list management module(s) 240 updates the selected-item list data field 712 to include a notification attribute linked to the selected item. The notification attribute is, for example, location-based or event-based, as described above in connection with FIG. 7. In example embodiments, a notification attribute includes a number of key-values pairs or tuples that specify the parameters of the notification attribute.

For example, a location-based attribute includes a number of parameters, including for example, a distance threshold. Accordingly, an example location-based attribute includes a key-value pair ("distance", "10 miles") as a parameter that specifies a notification event occurs if the user is within 10 miles of a store location of the registered vendor and if the store location has the selected vendor item in inventory. In another example, the location-based attribute additionally includes a key-value pair ("price", "$50") as a parameter that specifies that the notification event occurs if the store location also sells the selected vendor item for $50 or less.

An event-based attribute includes a number of parameters, including for example, a day and time. Accordingly, an example event-based attribute includes a year-month-day-time tuple, such as (2015, 12, 01, 8:00) as a parameter that specifies a notification event occurs on Dec. 1, 2015 at 8:00 AM. In another example, an example event-based attribute includes an event identifier that is usable to identify stored events of a digital calendar. The digital calendar is stored for example, by the user device 110 or accessible by the user device 110 over the Internet. In example embodiments, a notification attribute includes both location-based attributes and event-based attributes.

The notification attribute is defined either based on user input received by the listing system 150 and/or by a default value if the registered user does not specify a notification attribute. For example, in response to the user selecting a vendor item to be added to the selected-item list within a web resource of an online marketplace, the user device 110 displays an interface for the user to specify notification attributes. For example, the user enters in the threshold distance into a text input box to define a location-based attribute, and the user enters event-based attributes by selecting dates/events of an interface displaying a calendar. The user device 110 provides to the listing system 150 the user input. If no user input is provided, the listing service 150 uses a default notification attribute, such as a location-based attribute specifying a threshold distance of a predetermined value (e.g., 3 miles).

At block 830, the notification management module 250 detects whether a notification event of the item has occurred. The notification event is determined at least partly based on the notification attribute. Example embodiments of methods of the block 830 will be described in connection with FIGS. 9-11.

At block 840, the notification management module(s) 250, in response to a detection of a notification event of the first item, provides notification messages to the one or more user devices linked to the user account. The notification management module(s) 250 pushes notification messages to the one or more user devices and/or transmits the notification messages in response to the one or more user devices pulling the messages. As stated, in example embodiments, the notification message includes a control element that is user-selectable to share the notification message with a second registered user.

The notification management module(s) 250 pushes notification messages based at least partly on the device identifiers data field 714 of the user account 702. For example, the device identifiers data field 714 is usable to determine addresses (e.g., IP addresses and/or phone number) of the one or more user devices of the registered user over the network 104. For example, the notification management module(s) 250 accesses the user account 702 and determines the addresses of the user devices based on the device identifiers data field 714. In turn, the notification management module(s) 250 provides the notification message to the one or more user devices based on the determined addresses.

After block 840, the method 800 ends.

Figure 9:
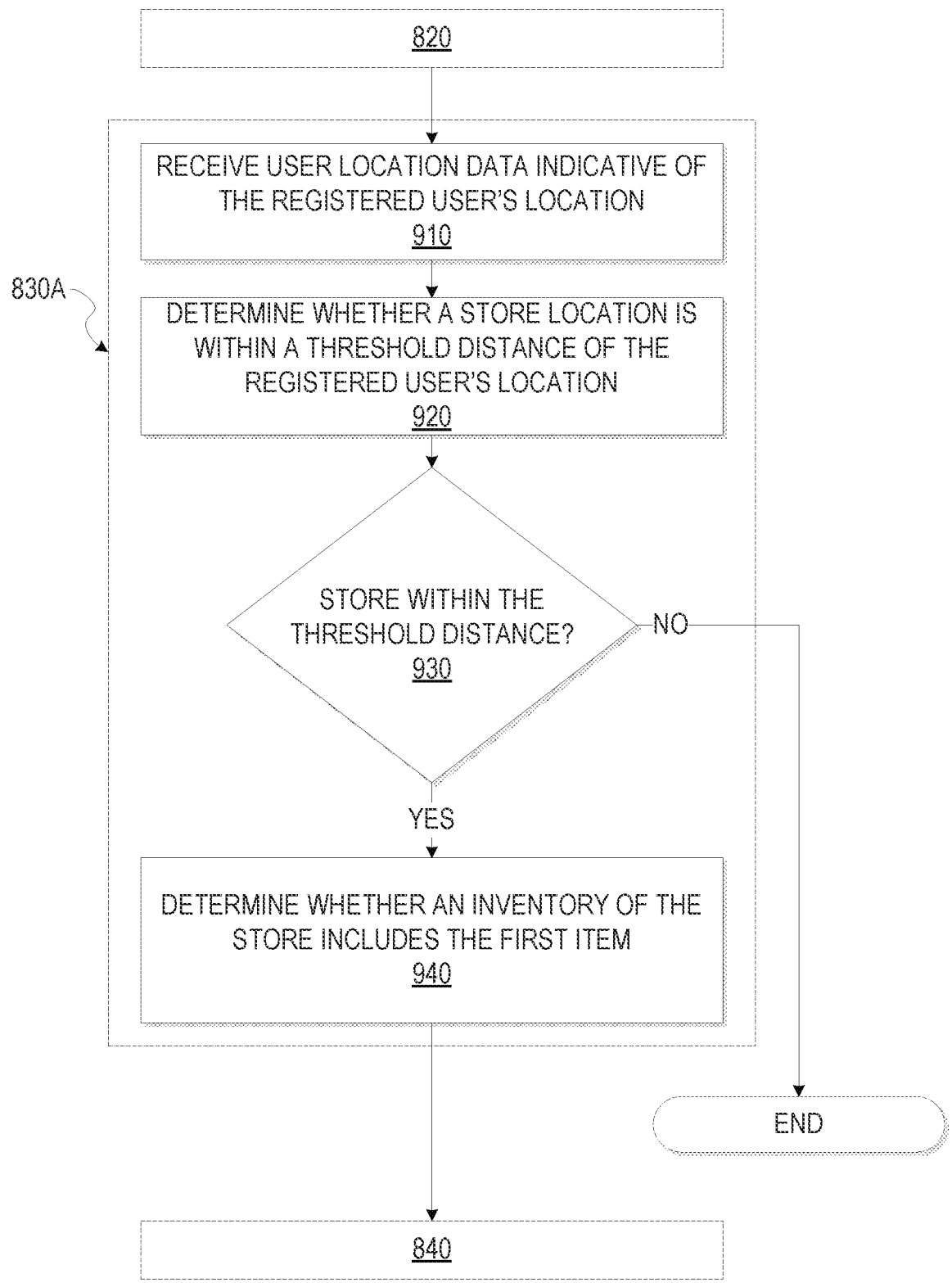
FIGS. 9-11 are flowcharts illustrating example methods of detecting a notification event of FIG. 8, in accordance with an example embodiment.

FIG. 9 is a flowchart illustrating an example method of detecting a notification event of FIG. 8, in accordance with an example embodiment. Elements common to FIGS. 8 and 9 share common reference indicia, and only differences between the figures are described herein for the sake of brevity. The example block 830A performs detection of a notification event that is specified by a location-based notification attribute. That is, a notification event corresponds to the registered user being within a predetermined threshold of one of the store locations of the registered vendor. The method of the example block 830A includes operations such as receiving user location data (block 910), determining whether a store location is within a threshold distance (block 920), and determining whether an inventory of the store includes the first item (block 940). The method of the example block 830A will be described below, by way of explanation, as being performed by certain modules. It will be appreciated, however, that the operations of the method of the example block 830A can be performed in any suitable order by any number of the modules shown in FIG. 2.

At block 910, the notification management module(s) 250 receives user location data indicative of the registered user's location. The user location data correspond to GPS location data generated by the user device, such as the user device 110 of FIG. 1, and that is sent to the notification management module(s) 250. At block 920, the notification management module(s) 250 determines whether a store location is within a threshold distance of the first registered user's location. At block 930, the block 830A ends in response to a determination that no store is within the threshold distance; on the other hand, in response to a determination that there is a store location within a threshold distance, the block 830A moves to block 940 for determining whether an inventory of the store includes the first item. For example, the data storage interface module(s) 220 accesses the store data field 724 to access inventory data and determine whether or not an item identifier in the inventory data matches an item identifier of the first item. In the case that there is a match, the notification management module(s) 250 makes a determination that a notification event of the first item has been detected. In turn, the method of the example block 830A continues to block 840. In example embodiments, the example block 830A repeats blocks 920-940 for each item of the registered user's selected-item list (e.g., as represented by the selected-item list data field 712).

In example embodiments, a first user and a second user can create a relationship to share data within the listing system 150 in a number of ways, e.g., as described in connection with FIG. 10. For example, the first user can create a relationship by authorizing the listing system 150 to access contact information (e.g., contacts stored on the user device 110, an email account, a social network website, and so forth) to facilitate the creation of groups and/or "circles." As an illustrative example, the first user selects the second user from a contact list stored on the first user's mobile phone to form a group to share location and/or selected-item-list data. The first user can select one or more additional users to include in the group. The group can have a social network or a social graph (or circle) structure. The first user can select to share one or more list items (e.g., items included in a selected-items list of the first user) and/or location data to share with the group. In this way, members of the group have access to data that is indicative of the shared list items and/or location of the first user.

In example embodiments, as stated, the location of the first user can be shared with the second user and/or the group. For instance, as a particular illustrative example, a first user elects to share his location (e.g., by making his location data accessible) with a group of contacts. In operation, the first user visits (or is within a threshold distance of) a store location of a registered vendor. A second user of the group receives a notification from the listing system 150 if the second user has selected the registered vendor to request receiving notifications when another user visits a store location of the registered vendor. An example of the notification can include text such as "Hi Second User, First User here! I'm in Registered Vendor. Do you want anything here?"

Furthermore, in example embodiments, the second user can elect to share vendor items from the second user's selected-item list with the first user and/or the group. In the particular illustrative example, the listing system 150 can provide the second user a notification including "Hi Second User, First User here!I'm in Registered Vendor. Do you want this particular item from your wishlist/anything from here."

Figure 10:
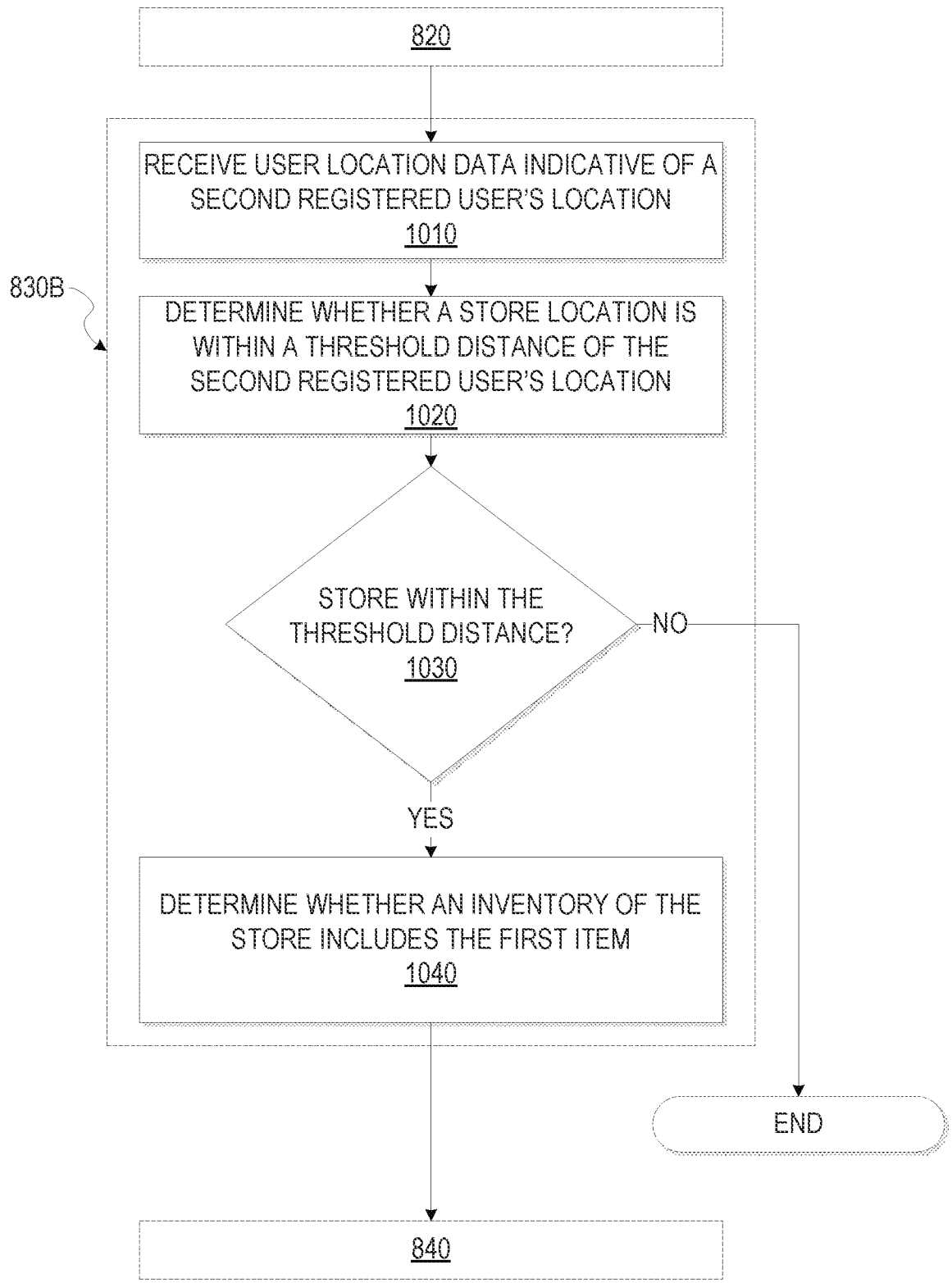

FIG. 10 is a flowchart illustrating an example method of detecting a notification event of FIG. 8, in accordance with an example embodiment. Elements common to FIGS. 8 and 10 share common reference indicia, and only differences between the figures are described herein for the sake of brevity. The example block 830B performs detection of a location-based notification event. In particular, the notification event is triggered by a second user being within a predetermined threshold of a store location. The registered user of the method 800 will be referred to as the first registered user. This type of detection facilitates sharing and cooperation between multiple users. The notification message sent to the first user indicates that the second authorized user is near the first item and/or a store location of a registered vendor. Additionally, the notification message includes control elements that facilitate the first authorized user sending information regarding the first item and its location to the second authorized user.

The method of the example block 830B includes operations such as receiving user location data (block 1010), determining whether a store location is within a threshold distance (block 1020), and determining whether an inventory of the store includes the first item (block 1040). The method of the example block 830B will be described below, by way of explanation, as being performed by certain modules. It will be appreciated, however, that the operations of the method of the example block 830B can be performed in any suitable order by any number of the modules shown in FIG. 2.

At block 1010, the notification management module(s) 250 receives user location data indicative of a second registered user's location. The second registered user is a user that the first registered user has shared at least a portion of the first user's selected-item list. For example, the first registered user selects a number of items from the selected-item list data field 712 to share with the second registered user. In example embodiments, the second registered user accepts or declines the share request. The location data of the second registered user correspond to GPS location data generated by the second registered user's user device, such as a second user device 110 of FIG. 1. The notification management module(s) 250 receives the location data from the user device of the second registered user via the network 104.

At block 1020, the notification management module(s) 250 determines whether a store location is within a threshold distance of the second registered user's location. At block 1030, the block 830B ends in response to a determination that no stores are within the threshold distance; otherwise, in response to a determination that there is a store location within the threshold distance, the method of the example block 830B moves to block 1040 for determining whether an inventory of the store includes the first item. The block 1040 can be performed in similar manner as described above in connection with block 940 of FIG. 9. In the case that there is a match, the notification management module(s) 250 makes a determination that a notification event of the first item has been detected. In turn, the method of the example block 830B continues to block 840 for sending a notification message to the user device of the first registered user. In example embodiments, the example block 830B repeats blocks 1020-1040 for each item of the first registered user's selected-item list (e.g., as represented by the selected-item list data field 712) that has been shared with the second registered user (e.g., as represented by the shared data field 716).

Additionally or alternatively, in example embodiments, the notification management module(s) 250 sends a notification message to the first registered user based on location data of the first registered user relative to store locations linked to an item of the second registered user. This type of detection facilitates sharing and gifting between multiple users. For example, the shared data field 716 includes data that is indicative of a request by the first registered user to allow the second registered user to generate notification messages for the first registered user. As a non-limiting illustrative example, the first registered user corresponds to the child of the second registered user. In this situation, the parent (e.g., the second registered user) creates a selected-item list on the parent's user device so that the child (e.g., the first registered user) receives a notification to pick up selected groceries when the child walks near a selected grocery chain (e.g., a registered vendor).

Accordingly, the notification management module 250 receives user location data that is indicative of a second registered user's location and determine whether a store location is within a threshold distance of the second registered user's location. In response to a determination that a store location is within a threshold distance of the second registered user's location, the notification management module 250 receives inventory data of the store location and determine whether the inventory data includes a first item of the first user's selected-item list data field 712. In response to a determination that the inventory data includes the first item, the notification management module(s) 250 provides a notification message to a user device of the second registered user.

Figure 11:
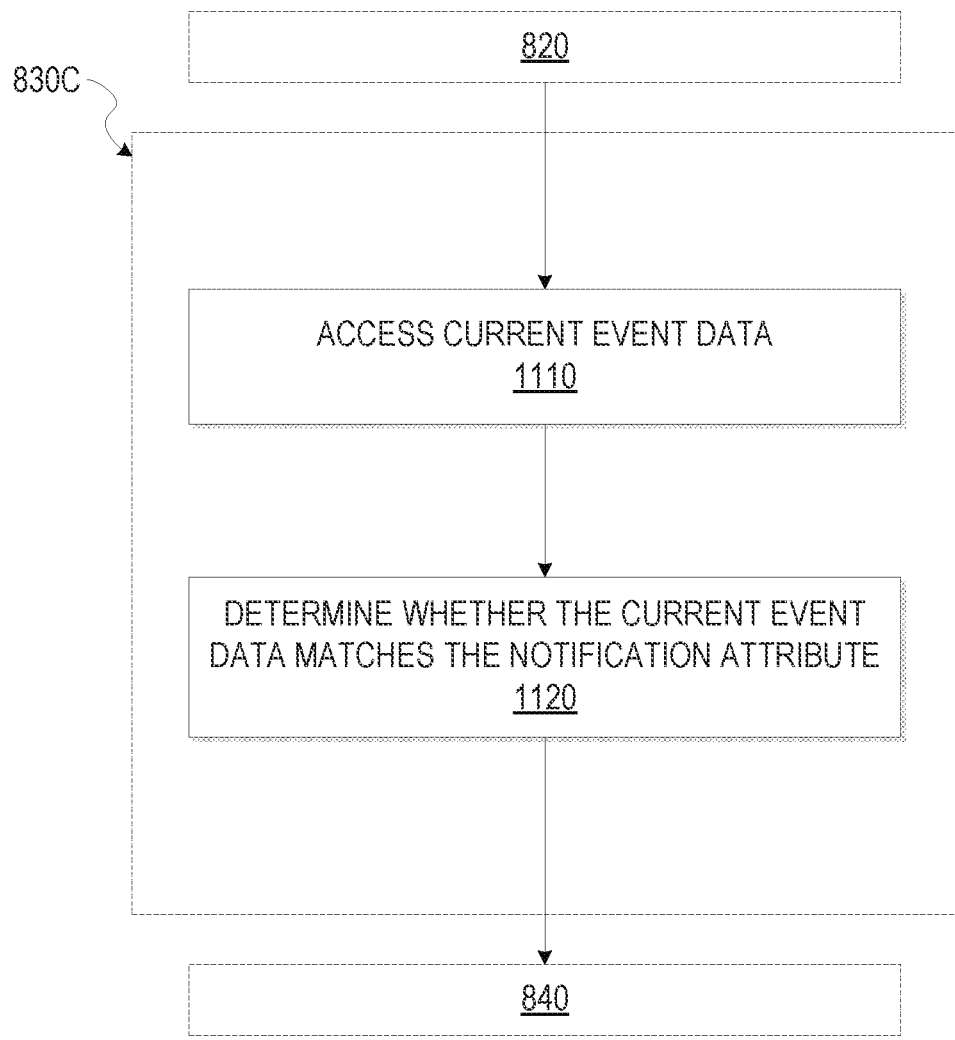

FIG. 11 is a flowchart illustrating an example method of detecting a notification event of FIG. 8, in accordance with an example embodiment. Elements common to FIGS. 8 and 11 share common reference indicia, and only differences between the figures are described herein for the sake of brevity. The example block 830C performs detection of a notification event when the notification attribute is based on a calendar event. The method of the example block 830C includes operations such as accessing current event data (block 1110) and determining whether the current event data matches the notification attributes (block 1112). The method of the example block 830C will be described below, by way of explanation, as being performed by certain modules. It will be appreciated, however, that the operations of the method of the example block 830C can be performed in any suitable order by any number of the modules shown in FIG. 2.

At block 1110, the notification management module(s) 250 accesses current event data, such as a current date and time. At block 1120, the notification management module(s) 250 determines whether the current event data matches the notification attributes of the first item. For example, the notification attribute specifies a target date and time. As such, the current event data matches the notification attributes if the current time is equal to or is later than the target date and time.

The notification management module(s) 250 creates a notification attribute based on a calendar time. For example, in response to receiving an add item request from a registered user, the notification management module(s) 250 accesses calendar data that is indicative of a calendar event. Examples of calendar events include a target date and time, a birthday, a reoccurring date (e.g., the first Monday of each month), and the like. Calendar data are provided by a third-party application, such as a third-party social network application or software (e.g., profession productivity software). The notification management module(s) 250 receives user input from the user device that is indicative of a request to link the calendar event to the first item. In response, the notification management module(s) 250 updates the calendar data by linking the first item to the calendar event. A notification attribute is indicative of the calendar data that is linked to the first item is stored in the notification attribute data field 736 of the corresponding selected item record 706.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 2-11 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 12:
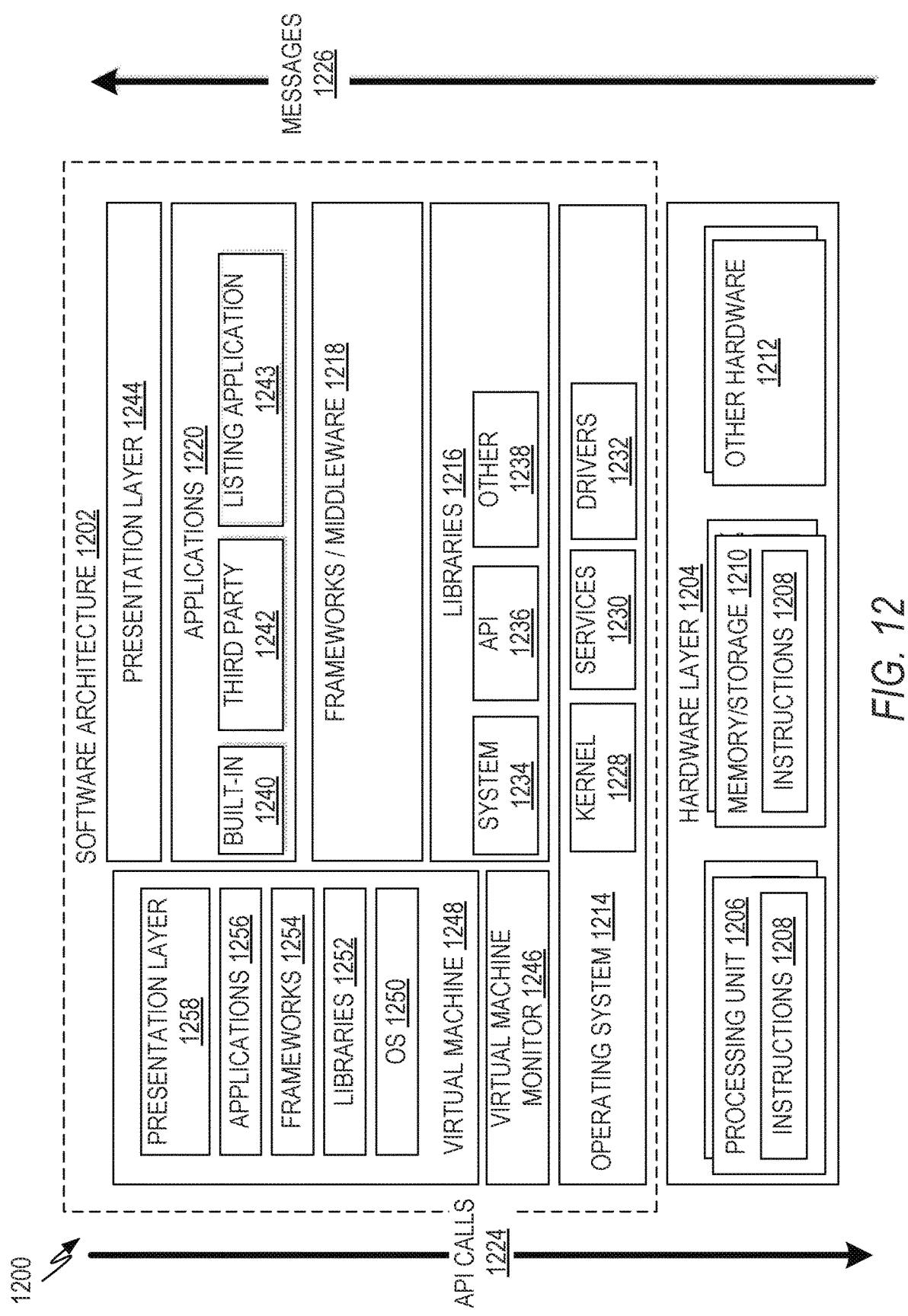
FIG. 12 is a block diagram illustrating an example of a software architecture that may be installed on a machine, according to some example embodiments.

FIG. 12 is a block diagram 1200 illustrating a representative software architecture 1202, which may be used in conjunction with various hardware architectures herein described. FIG. 12 is merely a non-limiting example of a software architecture and it will be appreciated that many other architectures may be implemented to facilitate the functionality described herein. The software architecture 1202 may be executing on hardware such as machine 1300 of FIG. 13 that includes, among other things, processors 1310, memory/storage 1330, and I/O components 1350. A representative hardware layer 1204 is illustrated and can represent, for example, the machine 1300 of FIG. 13. The representative hardware layer 1204 comprises one or more processing units 1206 having associated executable instructions 1208. Executable instructions 1208 represent the executable instructions of the software architecture 1202, including implementation of the methods, modules and so forth of FIGS. 2-11, as described below. Hardware layer 1204 also includes memory and/or storage modules 1210, which also have executable instructions 1208. Hardware layer 1204 may also comprise other hardware as indicated by 1212 that represents any other hardware of the hardware layer 1204, such as the other hardware illustrated as part of machine 1300.

In the example of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220 and presentation layer 1244. Operationally, the applications 1220 and/or other components within the layers may invoke application programming interface (API) calls 1224 through the software stack and receive a response, returned values, and so forth illustrated as messages 1226 in response to the API calls 1224. The layers illustrated are representative in nature; not all software architectures have all layers. For example, some mobile or special purpose operating systems may not provide a frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware 1218 (also sometimes referred to as middleware) may provide a higher-level common infrastructure that may be utilized by the applications 1220 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1220 and/or other software components/modules, some of which may be specific to a particular operating system or platform.

The applications 1220 include built-in applications 1240, third party applications 1242, and/or a listing application 1243. Examples of representative built-in applications 1240 may include, but are not limited to, a contacts application, a browser application, a book reader application, a location application, a media application, a messaging application, and/or a game application. Third party applications 1242 may include any of the built-in applications 1240 as well as a broad assortment of other applications. In a specific example, the third party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1242 may invoke the API calls 1224 provided by the mobile operating system such as operating system 1214 to facilitate functionality described herein. The listing application 1243 can include executable instructions of the implementation of the methods, modules, and so forth of FIGS. 2-11. In this example, the listing application 1243 invokes the API calls 1224 provided by the mobile operating system, such as operating system 1214, to facilitate functionality described in connection with FIGS. 2-11.

The applications 1220 may utilize built in operating system functions (e.g., kernel 1228, services 1230 and/or drivers 1232), libraries (e.g., system libraries 1234, API libraries 1236, and other libraries 1238), and frameworks/middleware 1218 to create user interfaces to interact with users of the software architecture 1202. Alternatively, or additionally, in some systems, interactions with a user may occur through a presentation layer, such as presentation layer 1244. In these systems, the application/module "logic" can be separated from the aspects of the application/module that interact with a user.

As stated, in the illustrated example embodiment, the applications 1220 deploy the modules 210-250 of the listing system. It will be appreciated, however, that the modules 210-250 of the listing system 150 can be implemented in one or more of the operating system 1214, the libraries 1216, the frameworks/middleware 128, the applications 1220, and the presentation layer 1244 in alternative example embodiments. Additionally or alternatively, additional or fewer layers can exist in alternative embodiments. For example, in a mobile device (e.g., user device 110), fewer layers may exist (for example, the frameworks/middleware layer 1218 may not exist), so for mobile devices at least portions of the modules 210-230 illustrated in FIG. 2 can be implemented as the listing application 1243 in conjunction with libraries and operating system services. In a server device (e.g., application server 140), additional layers may exist (for example, networking, security, encryption, and/or virtualization layers may exist), so for server devices at least portions of the modules 210-250 illustrated in FIG. 2 can be implemented as the listing application 1243 in conjunction with these additional layers as well as the middleware, libraries, and operating system services.

Some software architectures utilize virtual machines. In the example of FIG. 12, this is illustrated by virtual machine 1248. A virtual machine creates a software environment where applications/modules can execute as if they were executing on a hardware machine (such as the machine of FIG. 13, for example). A virtual machine is hosted by a host operating system (operating system 1214 in FIG. 13) and typically, although not always, has a virtual machine monitor 1246, which manages the operation of the virtual machine 1248 as well as the interface with the host operating system (i.e., operating system 1214). The software architecture 1202 executes within the virtual machine such as an operating system 1250, libraries 1252, frameworks/middleware 1254, applications 1256 and/or presentation layer 1258. These layers of software architecture 1202 executing within the virtual machine 1248 can be the same as corresponding layers previously described or may be different.

Figure 13:
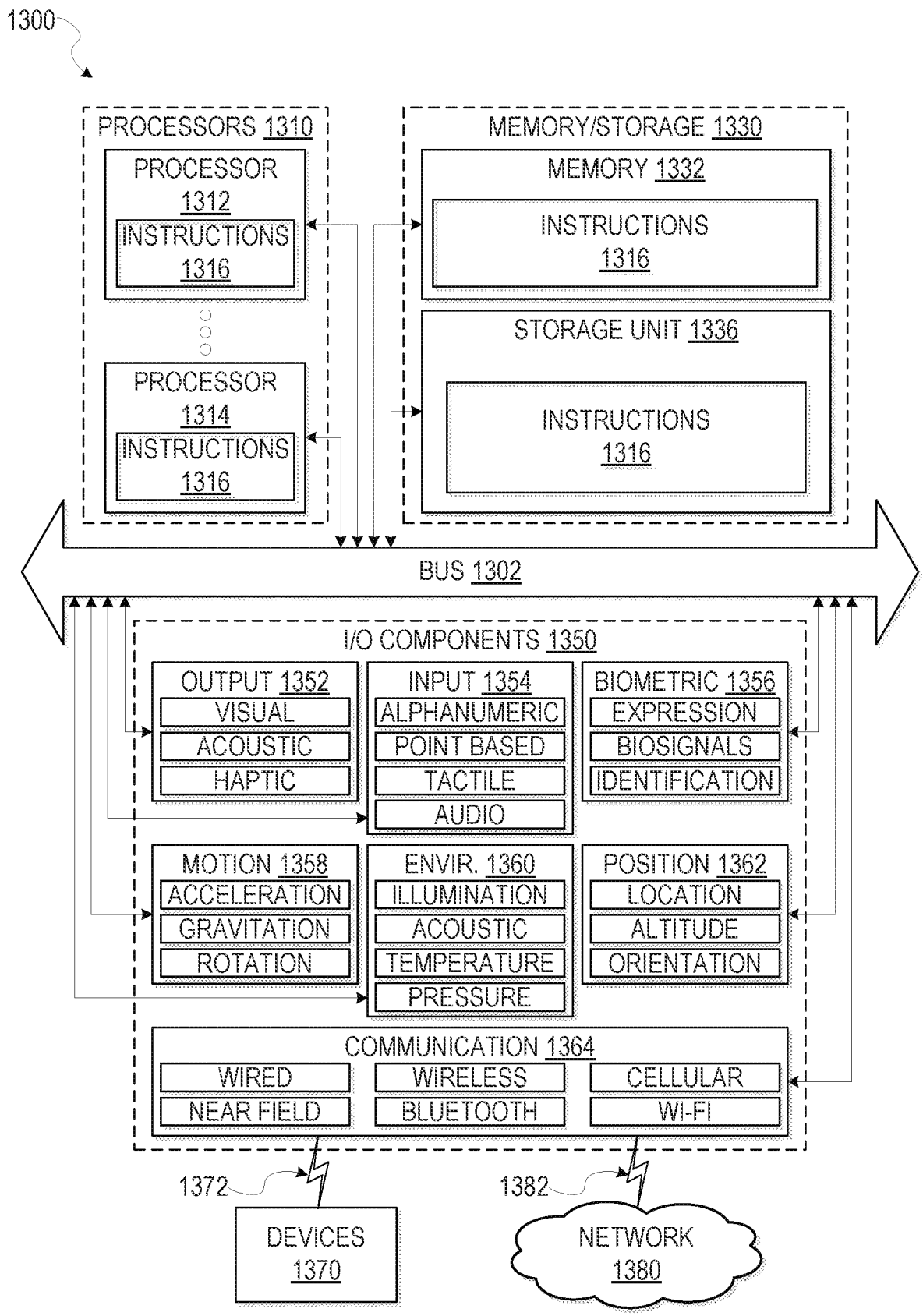
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example the instructions 1316 may cause the machine 1300 to execute the flow diagrams of FIGS. 8-11. Additionally, or alternatively, the instructions 1316 may implement the modules 210-250 of FIG. 2. The instructions 1316 transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (sometimes referred to as "cores") that may execute instructions contemporaneously. Although FIG. 13 shows multiple processors 1310, the machine 1300 may include a single processor with a single core, a single processor with multiple cores (e.g., a multi-core process), multiple processors with a single core, multiple processors with multiples cores, or any combination thereof.

The memory/storage 1330 may include a memory 1332, such as a main memory or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion, and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geo-location, location via Wi-Fi® signal triangulation, location via detecting a NFC beacon signal that may indicate a particular location, and so forth.

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at a client device, a first user input indicating a selection of an item;
in response to receiving the first user input indicating the selection of the item, presenting, at the client device, a first user interface for defining one or more parameters of a notification attribute, the first user interface comprising a location-based trigger option and an event-based trigger option;
receiving a first selection of the location-based trigger option;
presenting, at the client device and in response to the first selection, a second user interface including a field configured to receive a threshold distance of a target location for generating a location-based notification;
receiving a second user input indicating the threshold distance;
receiving a second selection of the event-based trigger option, the event-based trigger option being associated with a determination that a quantity of the item in an inventory of a store falls below a predetermined threshold;
presenting, at the client device and in response to the second selection, a third user interface;
presenting, in the third user interface, a calendar view that depicts a plurality of calendar events;
receiving, through the presented calendar view, a third user input of an event of the plurality of calendar events to trigger generation of an event-based notification;
providing an indication of the item in association with the threshold distance of the notification attribute and the event of the notification attribute to a remote computing device to update a database entry associated with the item;
detecting, using a GPS device, that a current location of the client device is within the threshold distance of the target location;
causing the remote computing device to trigger a notification event in response to detecting that the current location of the client device is within the threshold distance of the target location; and
in response to the remote computing device triggering the notification event, receiving, from the remote computing device, the notification event associated with the item in response to detecting that one or more of the threshold distance of the notification attribute and the event of the notification attribute have been satisfied.

2. The method of claim 1, further comprising:
presenting a fourth user interface comprising a plurality of display elements associated with respective items;
presenting in the fourth user interface a control element;
receiving fourth user input that selects the control element to modify organization of the plurality of display elements or filter the plurality of display elements; and
receiving, as the first user input, selection of a given one of the plurality of display elements.

3. The method of claim 1, further comprising:
sending authentication data to the remote computing device to authenticate the client device; and
in response to sending the authentication data, receiving data that authorizes the client device to access listing services of a web resource of a vendor.

4. The method of claim 1, further comprising:
generating a notification based on the received notification event associated with the item in response to detecting that the client device is within the threshold distance defined by the one or more parameters of the notification attribute.

5. The method of claim 4, wherein the notification includes a message with text that specifies that the client device is within the threshold distance of the store that includes the item in the inventory of the store.

6. The method of claim 1, further comprising:
scanning the item or a tag of the item in-store using a camera or sensor of the client device to indicate the selection of the item.

7. The method of claim 1, further comprising presenting a user privacy setting to prevent selected information from a user database comprising the item and associated with a user account associated with the client device from being shared with other user accounts.

8. The method of claim 1, further comprising:
receiving from the remote computing device, prior to receiving the second user input, a default threshold distance for triggering a notification associated with the notification event when the client device is within the default threshold distance of the store that sells the item.

9. The method of claim 1, wherein the item is a first item, and wherein the threshold distance is a first threshold distance that triggers a first notification when the client device is within the first threshold distance of a first store that sells the first item, the method further comprising:
receiving input that prioritizes purchases based on threshold distances by:
receiving a fourth user input indicating a second threshold distance for a second item to trigger a second notification when the client device is within the second threshold distance of a second store that sells the second item; and
receiving a fifth user input indicating a third threshold distance for a third item to trigger a third notification when the client device is within the third threshold distance of a third store that sells the third item.

10. A system comprising:
one or more processors; and
memory that stores instructions that, when executed by the one or more processors, configure the one or more processors to perform operations comprising:
receiving, at a client device, a first user input indicating a selection of an item;
in response to receiving the first user input indicating the selection of the item, presenting, at the client device, a first user interface for defining one or more parameters of a notification attribute, the first user interface comprising a location-based trigger option and an event-based trigger option;
receiving a first selection of the location-based trigger option;
presenting, at the client device and in response to the first selection, a second user interface including a field configured to receive a threshold distance of a target location for generating a location-based notification;
receiving a second user input indicating the threshold distance;
receiving a second selection of the event-based trigger option, the event-based trigger option being associated with a determination that a quantity of the item in an inventory of a store falls below a predetermined threshold;
presenting, at the client device and in response to the second selection, a third user interface;
presenting, in the third user interface, a calendar view that depicts a plurality of calendar events;
receiving, through the presented calendar view, a third user input of an event of the plurality of calendar events to trigger generation of an event-based notification;
providing an indication of the item in association with the threshold distance of the notification attribute and the event of the notification attribute to a remote computing device to update a database entry associated with the item;
detecting, using a GPS device, that a current location of the client device is within the threshold distance of the target location;
causing the remote computing device to trigger a notification event in response to detecting that the current location of the client device is within the threshold distance of the target location; and
in response to the remote computing device triggering the notification event, receiving, from the remote computing device, the notification event associated with the item in response to detecting that one or more of the threshold distance of the notification attribute and the event of the notification attribute have been satisfied.

11. The system of claim 10, the second user input defining the threshold distance, the operations further comprising:
in response to receiving the second user input, storing the threshold distance indicated by the second user input as part of the one or more parameters of the notification attribute.

12. The system of claim 10, the operations further comprising:
sending authentication data to the remote computing device to authenticate the client device; and
in response to sending the authentication data, receiving data that authorizes the client device to access listing services of a web resource of a vendor.

13. The system of claim 10, the operations further comprising:
generating a notification based on the received notification event associated with the item in response to detecting that the client device is within the threshold distance defined by the one or more parameters of the notification attribute and based on determining that a minimum threshold quantity of the item is available in the inventory of the store.

14. The system of claim 13, wherein the notification includes a message with text that specifies that the client device is within the threshold distance of the store that includes the item in the inventory of the store.

15. The method of claim 1, wherein the plurality of calendar events comprise at least one of scheduled appointments for the user, a birthday, anniversary, business trip, or vacation, and wherein the plurality of calendar events comprise a reoccurring event.

16. The method of claim 1, further comprising synching the plurality of calendar events from a calendar application of a third-party application.

17. The method of claim 1, further comprising linking the item to the event identified by the third user input received through the displayed calendar view.

18. A device-readable storage medium embodying instructions that, when executed by a device, cause the device to perform operations comprising:
   receiving, at a client device, a first user input indicating a selection of an item;
   in response to receiving the first user input indicating the selection of the item, presenting, at the client device, a first user interface for defining one or more parameters of a notification attribute, the first user interface comprising a location-based trigger option and an event-based trigger option;
   receiving a first selection of the location-based trigger option;
   presenting, at the client device and in response to the first selection, a second user interface including a field configured to receive a threshold distance of a target location for generating a location-based notification;
   receiving a second user input indicating the threshold distance;
   receiving a second selection of the event-based trigger option, the event-based trigger option being associated with a determination that a quantity of the item in an inventory of a store falls below a predetermined threshold;
   presenting, at the client device and in response to the second selection, a third user interface;
   presenting, in the third user interface, a calendar view that depicts a plurality of calendar events;
   receiving, through the presented calendar view, a third user input of an event of the plurality of calendar events to trigger generation of an event-based notification;
   providing an indication of the item in association with the threshold distance of the notification attribute and the event of the notification attribute to a remote computing device to update a database entry associated with the item;
   detecting, using a GPS device, that a current location of the client device is within the threshold distance of the target location;
   causing the remote computing device to trigger a notification event in response to detecting that the current location of the client device is within the threshold distance of the target location; and
   in response to the remote computing device triggering the notification event, receiving, from the remote computing device, the notification event associated with the item in response to detecting that one or more of the threshold distance of the notification attribute and the event of the notification attribute have been satisfied.

19. The device-readable storage medium of claim 18, the operations further comprising:
   presenting a fourth user interface comprising a plurality of display elements associated with respective items;
   presenting in the fourth user interface a control element;
   receiving fourth user input that selects the control element to modify organization of the plurality of display elements or filter the plurality of display elements; and
   receiving, as the first user input, selection of a given one of the plurality of display elements.

* * * * *